United States Patent
Maruhashi

(10) Patent No.: US 10,186,060 B2
(45) Date of Patent: Jan. 22, 2019

(54) METHOD FOR PROCESSING GRAPHS AND INFORMATION PROCESSING APPARATUS

(71) Applicant: FUJITSU LIMITED, Kawasaki-shi, Kanagawa (JP)

(72) Inventor: Koji Maruhashi, Hachioji (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/356,935

(22) Filed: Nov. 21, 2016

(65) Prior Publication Data

US 2017/0154445 A1    Jun. 1, 2017

(30) Foreign Application Priority Data

Nov. 26, 2015 (JP) .................. 2015-230573

(51) Int. Cl.
G06T 11/20    (2006.01)
G06N 7/00     (2006.01)
G06F 21/00    (2013.01)

(52) U.S. Cl.
CPC ............ *G06T 11/206* (2013.01); *G06F 21/00* (2013.01); *G06N 7/005* (2013.01)

(58) Field of Classification Search
CPC .................................................... G06T 11/206
(Continued)

(56) References Cited

U.S. PATENT DOCUMENTS

| | | | |
|---|---|---|---|
| 6,694,049 B1 * | 2/2004 | Woodall ................ | G06K 9/605 382/159 |
| 7,397,788 B2 * | 7/2008 | Mies ....................... | H04L 12/42 370/230 |

(Continued)

FOREIGN PATENT DOCUMENTS

| | | |
|---|---|---|
| JP | 2005-63277 | 3/2005 |
| JP | 2014-225117 | 12/2014 |

OTHER PUBLICATIONS

A Unified Framework for Link Recommendation Using Random Walks, Zhijun Yin et al., 2010 International Conference on Advances in Social Networks Analysis and Mining Advances in Social Networks Analysis and Mining (ASONAM), 2010 International Conference on. :152-159 Aug. 2010.*

(Continued)

*Primary Examiner* — Javid A Amini
(74) *Attorney, Agent, or Firm* — Fujitsu Patent Center

(57) ABSTRACT

A computer generates connection matrixes corresponding to subgraphs extracted from source graphs. The connection matrixes include a plurality of elements each describing a connection between nodes in a corresponding subgraph or between a node in the corresponding subgraph and a neighboring node connected to one of the nodes in the corresponding subgraph. Based on the connection matrixes, the computer then generates a reference matrix that indicates a characteristic pattern of connections of nodes in the subgraphs, taking into consideration an order in which these nodes are arranged. The computer further performs a node-ordering swap operation on individual subgraphs, such that a submatrix representing node-to-node connections in a subgraph will be more similar to the reference matrix. The node-ordering swap operation includes changing the order of two nodes in a subgraph or swapping one node in a subgraph with a neighboring node connected to that subgraph.

10 Claims, 26 Drawing Sheets

(58) Field of Classification Search
USPC .......................................................... 345/440
See application file for complete search history.

(56) References Cited

U.S. PATENT DOCUMENTS

| | | | |
|---|---|---|---|
| 7,450,845 B2* | 11/2008 | Beshai | H04L 49/357 370/351 |
| 2002/0174147 A1* | 11/2002 | Wang | G06F 17/30899 715/234 |
| 2003/0008287 A1* | 1/2003 | Black | G06T 7/0012 435/6.14 |
| 2005/0026600 A1* | 2/2005 | Hymel | H04M 1/274575 455/417 |
| 2005/0044073 A1* | 2/2005 | Inokuchi | G06F 17/30539 |
| 2014/0344207 A1* | 11/2014 | Maruhashi | G06N 7/005 706/52 |

OTHER PUBLICATIONS

Felipe Llinares-Lopez, et al.; "Fast and Memory-Efficient Significant Pattern Mining via Permutation Testing", KDD '15 Proceedings of the 21st ACM SIGKDD International Conference on Knowledge Discovery and Data Mining, Aug. 10-13, 2015, pp. 725-734 (10 pages).

* cited by examiner

FIG. 7

LOGFILES 111a, 111b

| SOURCE SERVER: Server-A | COLLECTION DATE: Nov. 1 |
|---|---|
| TIME | LOG MESSAGE |
| 9:01 | Source Account Number, Destination Account Number, Amount of Remittance, ... |
| 9:05 | ⋮ |
| 9:23 | ⋮ |
| ⋮ | ⋮ |

FIG. 8

GRAPH DATASETS
112a   112b

| DATE: Nov. 1 | | | LABEL: Fraudulent Event | | | |
|---|---|---|---|---|---|---|
| | P1 | P2 | P3 | P4 | P5 | P6 |
| P1 | 0 | 1 | 0 | 1 | 0 | 0 |
| P2 | 1 | 0 | 1 | 1 | 0 | 0 |
| P3 | 0 | 1 | 0 | 0 | 1 | 1 |
| P4 | 1 | 1 | 0 | 0 | 0 | 0 |
| P5 | 0 | 0 | 1 | 0 | 0 | 0 |
| P6 | 0 | 0 | 1 | 0 | 0 | 0 |

FIG. 9

REFERENCE PATTERNS
113a 113b

| LABEL: Fraudulent Event | | | |
|---|---|---|---|
|  | Q1 | Q2 | Q3 |
| Q1 | 0.0 | 1.0 | 0.0 |
| Q2 | 1.0 | 0.0 | 1.0 |
| Q3 | 0.0 | 1.0 | 0.0 |

...

FIG. 18  INSENSITIVE TO NODE MAPPING ORDER

FIG. 19  SENSITIVE TO NODE MAPPING ORDER

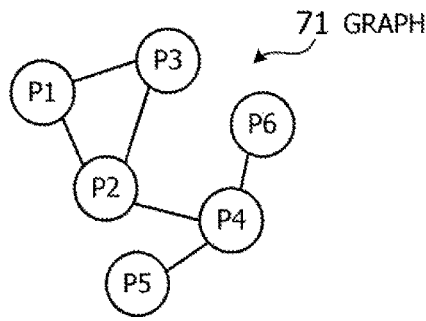
FIG. 21
71 GRAPH
72 GRAPH DATASET (MATRIX M)
|    | P1 | P2 | P3 | P4 | P5 | P6 |
|----|----|----|----|----|----|----|
| P1 | 0  | 1  | 1  | 0  | 0  | 0  |
| P2 | 1  | 0  | 1  | 1  | 0  | 0  |
| P3 | 1  | 1  | 0  | 0  | 0  | 0  |
| P4 | 0  | 1  | 0  | 0  | 1  | 1  |
| P5 | 0  | 0  | 0  | 1  | 0  | 0  |
| P6 | 0  | 0  | 0  | 1  | 0  | 0  |
73 NODE MAPPING PROBABILITY TABLE (MATRIX P)
|    | Q1  | Q2  | Q3  |
|----|-----|-----|-----|
| P1 | 0.7 | 0.1 | 0.1 |
| P2 | 0.2 | 0.8 | 0.0 |
| P3 | 0.0 | 0.0 | 0.8 |
| P4 | 0.1 | 0.0 | 0.0 |
| P5 | 0.0 | 0.1 | 0.0 |
| P6 | 0.0 | 0.0 | 0.1 |
SUBGRAPH 75
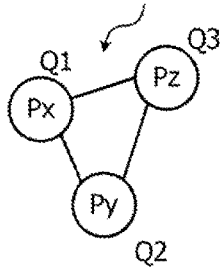
76 SUBGRAPH EXPECTED VALUE TABLE (P$^T$MP)
|         | Px (Q1) | Py (Q2) | Pz (Q3) |
|---------|---------|---------|---------|
| Px (Q1) | 0.3     | 0.7     | 0.8     |
| Py (Q2) | 0.7     | 0.2     | 0.8     |
| Pz (Q3) | 0.8     | 0.8     | 0.2     |

METHOD FOR PROCESSING GRAPHS AND INFORMATION PROCESSING APPARATUS

CROSS-REFERENCE TO RELATED APPLICATION

This application is based upon and claims the benefit of priority of the prior Japanese Patent Application No. 2015-230573, filed on Nov. 26, 2015, the entire contents of which are incorporated herein by reference.

FIELD

The embodiments discussed herein relate to a method for processing graphs and an information processing apparatus that performs the same.

BACKGROUND

Computer systems generate logfiles to record the result of various data processing operations that they perform. Some of those logfiles may indicate relationship between two entities. For example, communication logs of servers may contain records of data communication performed between a source server and a destination server, and bank transaction logs may indicate specific transactions performed between two accounts. On the basis of such relationship-indicative log records, a computer may generate a graph to represent processing activities that a plurality of entities in the system conducted during a specific time period. This graph is formed from nodes representing individual elements of the system and edges (i.e., connections between nodes) describing relationship between the elements.

The above-described logs may record some security problems, such as attacks in network communication and malicious activities in bank transactions. The graphs generated from logs in such days of fraudulent events may exhibit a particular characteristic pattern of nodes and edges. These logs are thus subjected to a process of searching for a subgraph that frequently appear in multiple graphs. The discovered subgraph is called a "frequent graph" and used to detect another fraudulent event in later logs. That is, if a known frequent graph is seen in a graph generated from a new log, then it suggests that the system is most likely to have encountered a similar fraudulent event.

Several techniques have been proposed to discover frequent graphs in a large number of graphs. For example, one proposed method enumerates frequent graphs with a relatively small size and growing them by adding nodes until their frequencies fall to or below a threshold. Another proposed method extracts frequent graphs by repetitively consolidating a frequent pair of adjacent nodes into one node. See, for example, the following documents:

Japanese Laid-open Patent Publication No. 2005-63277
Japanese Laid-open Patent Publication No. 2014-225117
Felipe Llinares-Lopez, Mahito Sugiyama, Laetitia Papaxanthos, Karsten M. Borgwardt, "Fast and Memory-Efficient Significant Pattern Mining via Permutation Testing," KDD'15 Proceedings of the 21st ACM SIGKDD International Conference on Knowledge Discovery and Data Mining, August 2015, Pages 725-734.

The conventional frequent graph discovery methods are non-deterministic polynomial time complete (NP-complete), and the number of possible combinations increases explosively with a growth of nodes. For example, the aforementioned method of adding nodes to small frequent graphs has to determine whether the subgraph in question matches with all the other possible subgraphs each time a node is added. Such graph matching problems are NP-complete and would run into a combinatorial explosion. In fact, the noted method is only suitable for graphs composed of several hundred nodes or the like.

Now think of a subgraph with several hundred nodes sampled from a given source graph. A frequent graph search is performed only within the subgraph. If a found graph is frequently seen in the above subgraph, then this would also hold true in a larger area in the source graph. Accordingly, the found frequent graph is used as a candidate graph in the next round of search in an expanded range of nodes. The described method is, however, also prone to run into combinatorial explosions because of its NP-completeness. It is therefore difficult to expand the search range to above several hundred nodes.

SUMMARY

In one aspect, there is provided a non-transitory computer-readable storage medium storing a graph program that causes a computer to perform a procedure including: extracting a plurality of subgraphs from a plurality of source graphs, each of the plurality of subgraphs including a specific number of nodes; first generating a plurality of connection matrixes for the plurality of subgraphs, respectively, each of the plurality of connection matrixes including connection information of a first plurality of nodes in a corresponding subgraph, each of the first plurality of nodes having an ordering number, the connection information including connection relationships among the first plurality of nodes and connection relationships between the first plurality of nodes and a plurality of neighboring nodes, the plurality of neighboring nodes being connected to at least one of the first plurality of nodes; second generating a reference matrix from the plurality of connection matrixes, the reference matrix including connection pattern characteristic information of the plurality of subgraphs, the connection pattern characteristic information including connection pattern characteristics of nodes with a same ordering number in the plurality of subgraphs; and performing a node-ordering swap operation respectively for the each of the plurality of subgraphs, the node-ordering swap operation including swapping order numbers of two nodes in a subgraph or swapping one node in the subgraph with a neighboring node such that a similarity of the reference matrix and a submatrix become larger, the submatrix representing node-to-node connections in the subgraph.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of logfiles;

FIG. 8 illustrates an example of graph datasets;

FIG. 9 illustrates an example of reference patterns;

FIG. 21 illustrates an exemplary calculation of expected values of connections in a subgraph;

DESCRIPTION OF EMBODIMENTS

Several embodiments will be described below with reference to the accompanying drawings. These embodiments may be combined with each other unless they have contradictory features.

(a) First Embodiment

Figure 1:
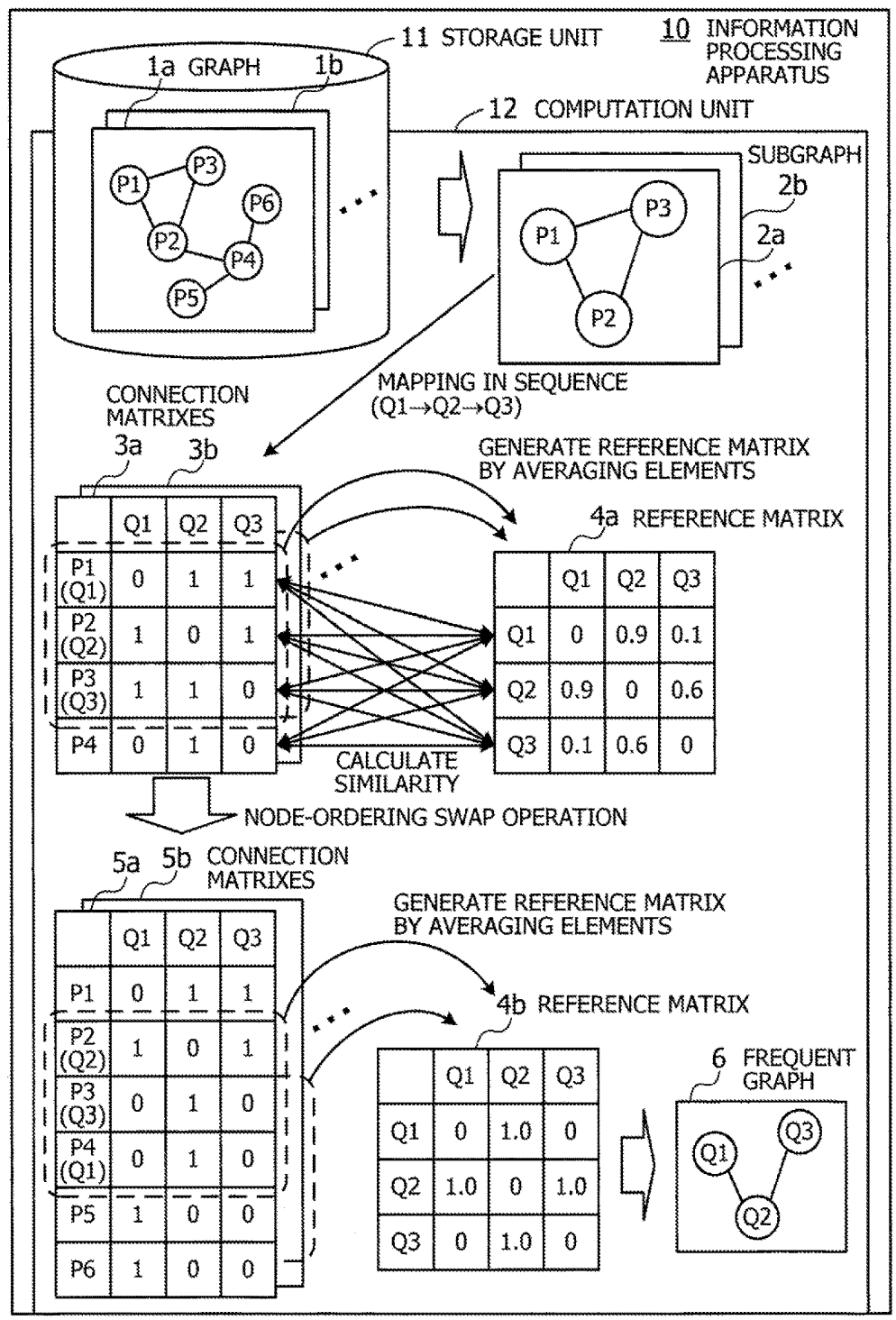
FIG. 1 illustrates an example of an information processing apparatus according to a first embodiment.

A first embodiment will now be described below. FIG. 1 illustrates an example of an information processing apparatus according to the first embodiment. This information processing apparatus 10 includes a storage unit 11 and a computation unit 12.

The storage unit 11 is configured to store therein a plurality of graphs 1a, 1b, and so on, which are generated from log records of data processing operations performed on another computer system. For example, these graphs 1a, 1b, ... represent statistics of data processing events, such as communication traffic between servers and money transfer between bank accounts.

The computation unit 12 processes graphs 1a, 1b, ... and, more particularly, searches them for frequent graphs 6 contained therein. Specifically the computation unit 12 executes a procedure described below.

The computation unit 12 first extracts subgraphs 2a, 2b, ... respectively from given graphs 1a, 1b, ... (referred to as "source graphs" where appropriate) where each subgraph includes a specific number of nodes. For example, the computation unit 12 samples a specific number of nodes to extract one or more subgraphs 2a, 2b, ... from individual source graphs. The computation unit 12 then selects the extracted subgraphs 2a, 2b, ... one by one and determines the order of nodes that constitute each selected subgraph. The computation unit 12 further generates connection matrixes 3a, 3b, ... to describe connective relationships between nodes in the selected subgraph or between a node in the selected subgraph and a neighboring node that has a connective relationship with one of the nodes in the selected subgraph. Here, two nodes in a graph or subgraph are said to have a "connective relationship" (or simply a "connection") when one node is connected to the other node.

The rows of connection matrixes 3a, 3b, correspond to nodes of their corresponding source graphs 1a, 1b, ... from which the subgraphs 2a, 2b, ... have been extracted. Each connection matrix 3a, 3b, ... has column headers to indicate the order of nodes that the corresponding subgraph 2a, 2b, ... contains. In the example of FIG. 1, the symbol "Q1" represents the first node, "Q2" the second node, and "Q3" the third node. Each intersection of a row and a column of the connection matrixes 3a, 3b, ... contains a value that indicates whether the source-graph node corresponding to the row is connected to the subgraph node corresponding to the column. For example, the intersection may contain a value of one to indicate the presence of a connection or a value of zero to indicate the absence of the same.

Subsequently the computation unit 12 generates a reference matrix 4a that indicates a particular characteristic pattern of connections of nodes in the subgraphs 2a, 2b, ..., based on their corresponding connection matrixes 3a, 3b, ... discussed above. In this processing, the computation unit 12 takes into consideration the order in which the nodes in subgraphs are arranged. That is, the computation unit 12 evaluates node-to-node connections in the subgraphs by calculating how many of nodes placed in one specific node position in the subgraphs are connected to nodes placed in another specific node position in the subgraphs. As an exemplary characteristic pattern, the computation unit 12 may determine average connective relationships between subgraph nodes. More specifically, each connection matrix 3a, 3b, ... has three components in the row corresponding to the first node Q1 in the subgraphs 2a, 2b, ..., and these components are respectively averaged among the connection matrixes 3a, 3b, ... and entered to the first row (Q1) of the reference matrix 4a.

The computation unit 12 now selects the subgraphs 2a, 2b, ... one by one and executes node-ordering swap operations on each selected subgraph, such that the submatrix representing node-to-node connections in the selected subgraph will be more similar to the reference matrix 4a. A node-ordering swap operation may actually change the order of nodes in the selected subgraph or may swap one node in the selected subgraph with a neighboring node that is not in the selected subgraph but connected to a node in the subgraph.

To be more specific about node swapping, the computation unit 12 first calculates similarity of components between each row in one connection matrix 3a, 3b, ... of interest and that of the reference matrix 4a. For example, the cosine similarity between vectors may be calculated here as a measure of row-to-row similarity. Then the computation unit 12 determines whether the connection matrix 3a has any row that is more similar to one of the rows in the reference matrix 4a than its currently corresponding row in the connection matrix 3a. For example, one row in the connection matrix 3a corresponds to the first node P1 in the subgraph 2a, and this row corresponds to the first row (Q1) in the reference matrix 4a. If any other row than the noted row (P1) in the connection matrix 3a is more similar to the first row (Q1) in the reference matrix 4a, then the computation unit 12 swaps the first node Q1 in the subgraph 2a with the node corresponding to that more similar row. This node swapping introduces a new node into the subgraph 2a as its first node. In the example of FIG. 1, the original first node P1 in the subgraph 2a is swapped with node P4 in the source graph 1a.

When a node in subgraphs 2a, 2b, . . . is swapped with another node, the computation unit 12 executes another round of connection matrix generation, reference matrix generation, and node-ordering swap operation. This brings new connection matrixes 5a, 5b, . . . as seen in the bottom part of FIG. 1, and consequently a new reference matrix 4b based thereon. Such iterative revising continues until the node-ordering swap operation finds no more similarity-improving swapping solutions.

When similarity-improving swapping solutions are exhausted, the computation unit 12 outputs the latest version of the reference matrix 4b. This reference matrix 4b actually indicates connective relationships between nodes in a graph 6. Every revised subgraph 2a, 2b, . . . at this moment has node-to-node connections resembling those in the graph 6 of the reference matrix 4b. Because of the presence of many such resembling subgraphs, the noted graph 6 is qualified to be a frequent graph.

As can be seen from the above description, the proposed information processing apparatus 10 generates an initial version of a reference matrix 4a on the basis of connective relationships of numbered nodes in subgraphs 2a, 2b, . . . , without considering possibilities of different node orders. This reference matrix 4a represents average connective relationships between nodes in the subgraphs 2a, 2b, . . . . The information processing apparatus 10 then swaps a node in a subgraph 2a, 2b, . . . with either another node in the same subgraph or a neighboring node connected to that subgraph. Such node-ordering swap operations cause the subgraphs 2a, 2b, . . . to gradually approach a frequent graph 6 even if their initial versions have dissimilar connective relationships between nodes. In other words, the first embodiment provides an efficient method for discovering frequent graphs.

The process of frequent graph discovery is invoked each time a new graph is added to the storage unit 11. Upon entry of a new source graph, the computation unit 12 extracts a new subgraph from the entered source graph and executes node-ordering swap operations on the extracted subgraph with respect to the existing reference matrix 4b. These node-ordering swap operations cause the new subgraph to become closer to the existing frequent graph 6.

In addition to the above, the computation unit 12 may introduce the concept of probability to express the degree of whether each source node is included in subgraphs 2a, 2b, . . . , thereby ensuring more successful discovery of frequent graphs. For example, the computation unit 12 generates a stochastic matrix for each source graph 1a, 1b, . . . to describe the probability that individual nodes are selected from the graph, assuming that a subgraph 2a, 2b, . . . is built by sequentially selecting a specific number of such nodes. For example, the probability of node selection may take a random value in the range from zero to one. The computation unit 12 now selects the source graphs 1a, 1b, . . . one by one for the purpose of generating a first expected value matrix in the following way. The selected source graph has its corresponding stochastic matrix as noted above, and the computation unit 12 generates a first expected value matrix that contains first expected values, assuming that a specific number of nodes are sequentially selected from the selected source graph with the probabilities indicated in that stochastic matrix. The first expected values represent expected presence of connections between each node in the selected source graph and the above-noted specific number of nodes that are sequentially selected.

The computation unit 12 selects again the source graphs 1a, 1b, . . . one by one, now for the purpose of generating a second expected value matrix in the following way. That is, the computation unit 12 generates a second expected value matrix that contains second expected values, assuming that a subgraph 2a, 2b, . . . is formed by sequentially selecting a specific number of nodes from the selected source graph with the probabilities indicated in the stochastic matrix corresponding to the selected source graph. Each second expected value represents the expected presence of a connection between two nodes that are selected.

Based on the individual second expected value matrixes generated above from the source graphs 1a, 1b, . . . , the computation unit 12 further generates a reference matrix that indicates a specific characteristic pattern of connections between sequentially selected nodes in different subgraphs 2a, 2b, . . . respectively extracted from the source graphs. The computation unit 12 then selects the source graphs 1a, 1b, . . . one by one, now for the purpose of revising its corresponding stochastic matrix. Specifically, the computation unit 12 revises node selection probabilities in the stochastic matrix such that the first expected value matrix of the selected source graph will be more similar to the reference matrix.

The computation unit 12 repeats the above-described steps of generating first expected value matrixes, generating second expected value matrixes, generating a reference matrix, and revising node selection probabilities until the amount of such revisions falls to or below a specific threshold. The resulting final version of the reference matrix gives a specific graph representing connective relationships between nodes. The computation unit 12 takes this graph as a frequent graph.

The above-noted stochastic approach for describing nodes in subgraphs makes it possible to search the entire set of nodes in source graphs 1a, 1b, . . . in an exhaustive manner, thus ensuring successful discovery of frequent graphs.

It is noted that the computation unit 12 may be implemented with, for example, a processor used in the information processing apparatus 10. It is also noted that the storage unit 11 may be implemented with, for example, a memory or storage device used in the information processing apparatus 10.

(b) Second Embodiment

This part describes a second embodiment. Specifically, the second embodiment proposes a system for detecting suspicious activities performed on a computer system. This is an application of the foregoing techniques of frequent graph searching discussed in the first embodiment.

Figure 2:
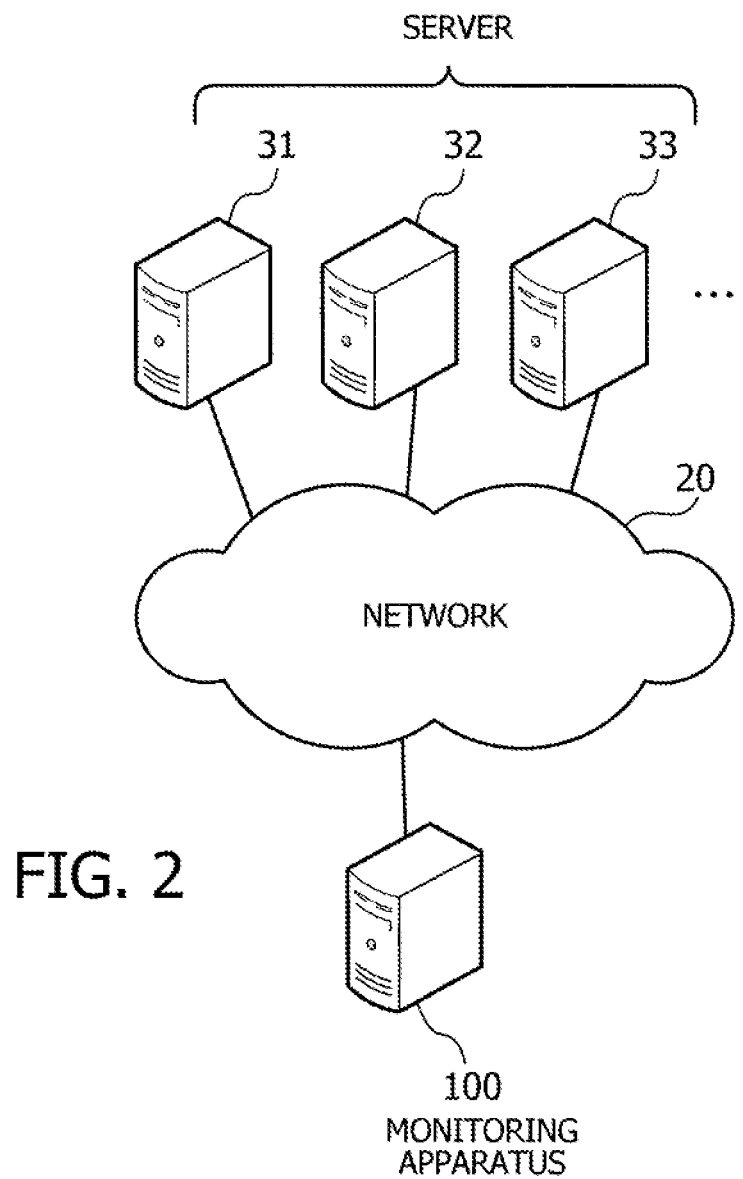
FIG. 2 illustrates an exemplary system configuration according to a second embodiment.

FIG. 2 illustrates an exemplary system configuration according to the second embodiment. The illustrated system is formed from many servers 31, 32, 33, . . . interconnected by a network 20. The servers 31, 32, 33, . . . work together to perform various processing services and generate their individual logfiles to record what they have done.

Also connected to the network 20 is a monitoring apparatus 100. This monitoring apparatus 100 collects logfiles from the servers 31, 32, 33, . . . and keep checking whether they contain any suspicious records indicating fraudulent activities. For example, the monitoring apparatus 100 determines the possibility of a fraudulent transaction, based on log records of communication between the servers 31, 32, 33, . . . . When those servers 31, 32, 33, . . . are part of a transaction systems in a bank, the monitoring apparatus 100 checks log records of transactions between bank accounts to detect any suspicious transactions.

Figure 3:
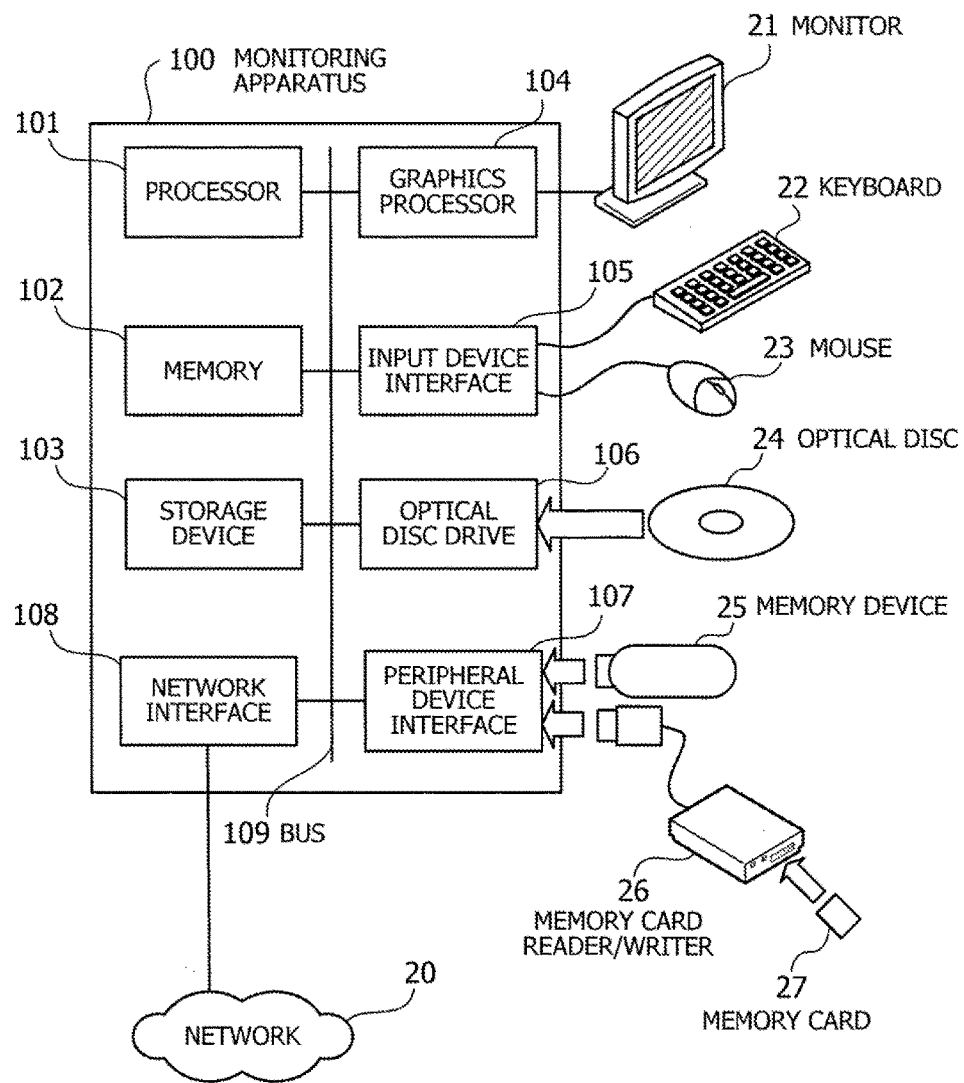
FIG. 3 illustrates an exemplary hardware configuration of a monitoring apparatus used in the second embodiment.

FIG. 3 illustrates an exemplary hardware configuration of a monitoring apparatus used in the second embodiment. The illustrated monitoring apparatus 100 has a processor 101 to control its entire operation. The processor 101 is connected to a memory 102 and other various devices and interfaces on a bus 109. The processor 101 may be a single processing device or a multiprocessor system including two or more processing devices, such as a central processing unit (CPU), micro processing unit (MPU), and digital signal processor (DSP). It is also possible to implement processing functions of the processor 101 and its programs wholly or partly with an application-specific integrated circuit (ASIC), programmable logic device (PLD), or other electronic circuits, or any combination of them.

The memory 102 serves as the primary storage device of the monitoring apparatus 100. Specifically, the memory 102 is used to temporarily store at least some of the operating system (OS) programs and application programs that the processor 101 executes, as well as other various data objects that the processor 101 manipulates at runtime. For example, the memory 102 may be implemented by using volatile semiconductor memory devices such as a random access memory (RAM).

Other devices on the bus 109 include a storage device 103, a graphics processor 104, an input device interface 105, an optical disc drive 106, a peripheral device interface 107, and a network interface 108.

The storage device 103 writes and reads data electrically or magnetically in or on its internal storage medium. The storage device 103 serves as a secondary storage device of the computer 100 to store program and data files of the operating system and applications. For example, the storage device 103 may be implemented by using a hard disk drive (HDD) or a solid-state drive (SSD).

The graphics processor 104, coupled to a monitor 21, generates video images in accordance with drawing commands from the processor 101 and displays them on a screen of the monitor 21. The monitor 21 may be, for example, a cathode ray tube (CRT) display or a liquid crystal display.

The input device interface 105 is connected to input devices such as a keyboard 22 and a mouse 23 and supplies signals from those devices to the processor 101. The mouse 13 is a pointing device, which may be replaced with other kind of pointing devices such as a touchscreen, tablet, touchpad, and trackball.

The optical disc drive 106 reads out data encoded on an optical disc 24, by using laser light or the like. The optical disc 24 is a portable data storage medium, the data recorded on which can be read as a reflection of light or the lack of the same. The optical disc 24 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the monitoring apparatus 100. For example, the peripheral device interface 107 may be used to connect a memory device 25 and a memory card reader/writer 26. The memory device 25 is a data storage medium having a capability to communicate with the peripheral device interface 107. The memory card reader/writer 26 is an adapter used to write data to or read data from a memory card 27, which is a data storage medium in the form of a small card.

The network interface 108 is connected to a network 20 so as to exchange data with other computers or network devices (not illustrated).

The above-described hardware platform is used to implement the processing functions of the monitoring apparatus 100 according to the second embodiment. The illustrated hardware configuration may also be used to implement servers 31, 32, 33, . . . in the second embodiment. The same hardware configuration of the monitoring apparatus 100 of FIG. 3 may similarly be applied to the foregoing information processing apparatus 10 of the first embodiment.

The monitoring apparatus 100 provides various processing functions of the second embodiment by executing programs stored in a computer-readable storage medium. These processing functions are encoded in the form of computer programs, which may be stored in a variety of media. For example, the monitoring apparatus 100 may store program files in its storage device 103. The processor 101 reads out at least part of the programs stored in the storage device 103, loads them into the memory 102, and executes the loaded programs. Other possible storage locations for these programs include optical discs 24, memory devices 25, memory cards 27, and other portable storage media. The programs stored in a portable storage medium are installed in the storage device 103 under the control of the processor 101, so that they are ready to execute upon request. It may also be possible for the processor 101 to execute program codes read out of a portable storage medium, without installing them in its local storage devices.

Figure 4:
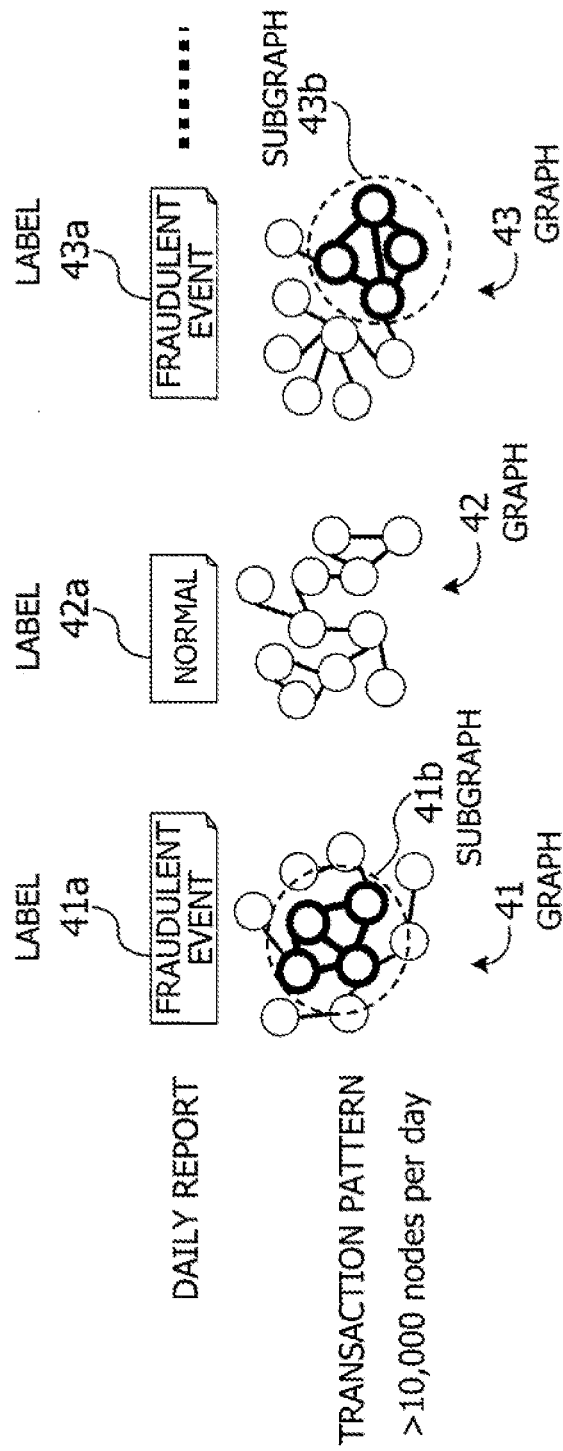
FIG. 4 illustrates how graphs may vary depending on the presence of fraudulent events.

The description now gives an outline of fraud detection techniques using graphs. FIG. 4 illustrates how graphs may vary depending on the presence of fraudulent events. Suppose, for example, that the monitoring apparatus 100 has generated a series of graphs 41, 42, 43, . . . on the basis of daily logs. These graphs 41, 42, 43, . . . represent patterns of transactions performed in each particular day. It is also assumed here that daily reports are issued along with the logs to indicate whether the servers experienced fraudulent transactions in an individual day. The monitoring apparatus 100 adds a label 41a, 42a, 43a, . . . to each generated graph 41, 42, 43, . . . to associate those graphs with their corresponding daily reports.

Specifically, two graphs 41 and 43 in FIG. 4 have their respective labels 41a and 43a that indicate the occurrence of fraudulent events. Such graphs 41 and 43 are highly likely to bear a close similarity in their subgraphs 41b and 43b. These similar subgraphs 41b and 43b are called "frequent graphs" and represent a characteristic pattern of activities commonly seen in the graphs 41 and 43 of the "fraudulent event" days. For example, in the case of graphs generated from server communication logfiles, the "fraudulent event" graphs 41 and 43 may include several tens of communication patterns peculiar to DDoS attacks or targeted attacks. As another example, in the case of graphs generated from bank transaction logfiles, the "fraudulent event" graphs 41 and 43 may include several tens of transaction patterns peculiar to money laundering or billing fraud.

Figure 5:
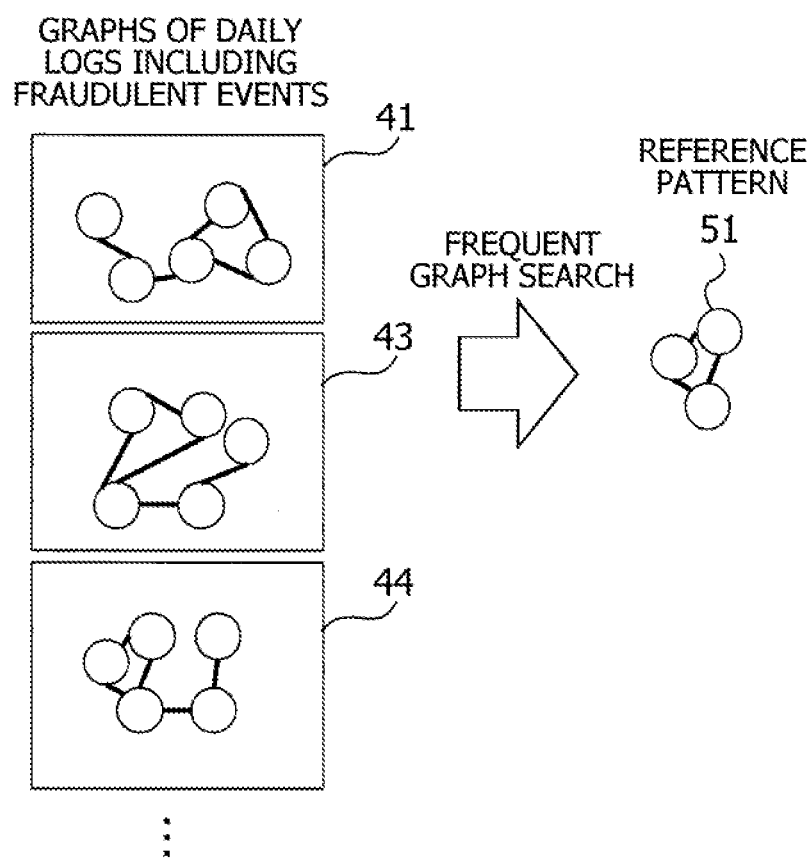
FIG. 5 illustrates an example of extracting a reference pattern.

In view of the above, the monitoring apparatus 100 is designed to search for such subgraphs 41b and 43b as frequent graphs for the purpose of fraud detection. FIG. 5 illustrates an example of extracting a reference pattern. Seen in this example of FIG. 5 is a collection of graphs 41, 42, 43, . . . generated from daily logs indicating fraudulent events. The monitoring apparatus 100 conducts a frequency graph search with these graphs 41, 43, 44, . . . and finds a frequent graph, or a reference pattern 51. The reference pattern 51 will enable the monitoring apparatus 100 to evaluate the possibility of frauds even in a day having no problem reports. For example, the monitoring apparatus 100 may evaluate a graph representing transactions in a "normal" day as to whether it contains subgraphs that match with the reference pattern 51. If the number of such matching subgraphs exceeds a threshold, then it suggests that some fraudulent transactions occurred in that day.

In the case of graphs generated from server communication logs, each graph 41, 42, 43, . . . is formed from nodes representing IP addresses of servers and edges representing communication between servers. In the case of graphs generated from bank transaction logs, the nodes in each graph 41, 42, 43, . . . represent account numbers, and the edges represent money remittance made between bank accounts. A typical graph in the latter case contains 10,000 or more nodes. This graph size imposes too much load on the conventional frequent graph search methods to extract frequent graphs. The second embodiment is therefore directed to a monitoring apparatus 100 that extracts frequent graphs with a smaller amount of computational load.

Figure 6:
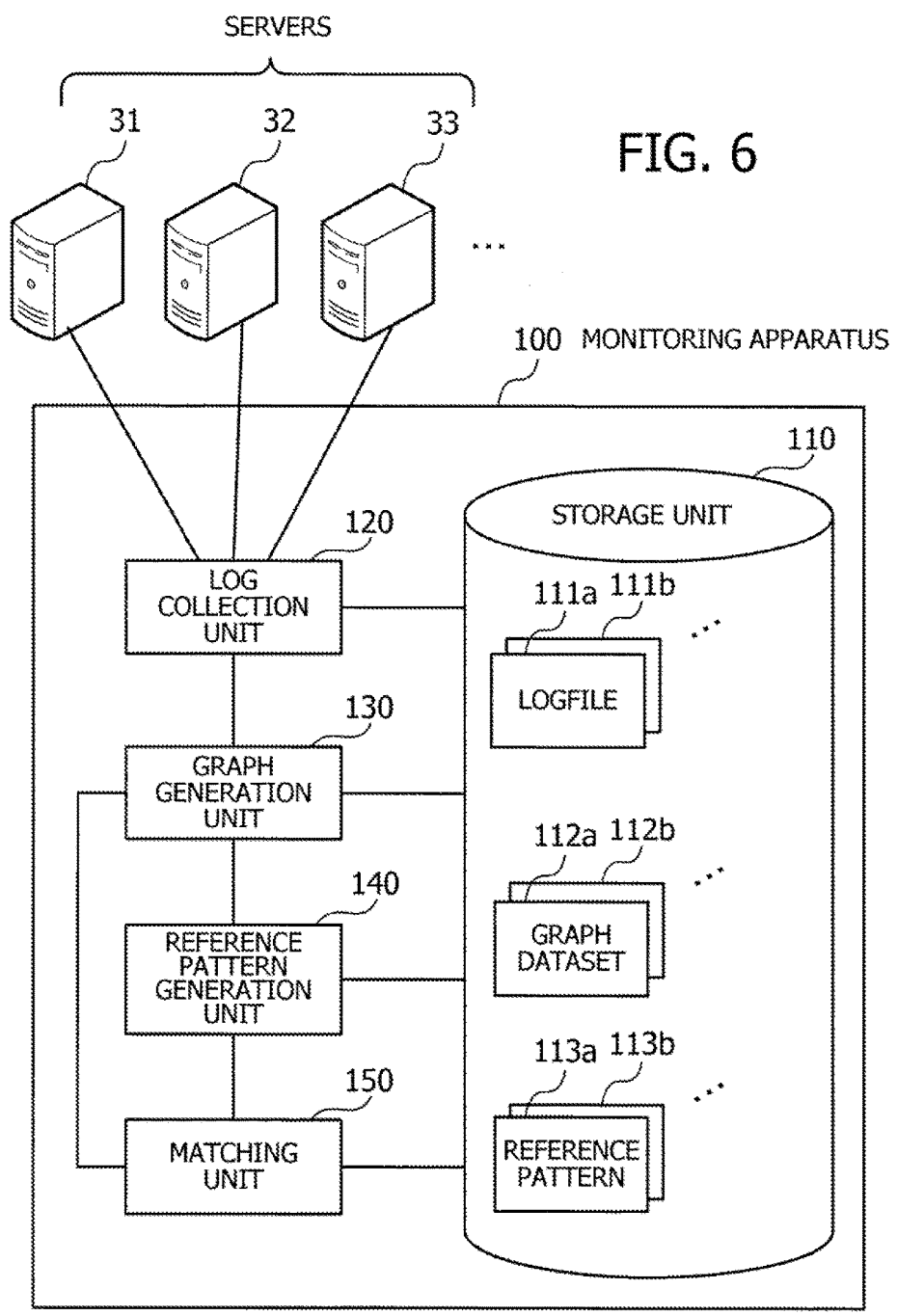
FIG. 6 is a block diagram describing what functions are implemented in a monitoring apparatus.

FIG. 6 is a block diagram describing what functions are implemented in a monitoring apparatus. The illustrated monitoring apparatus 100 includes a storage unit 110, a log collection unit 120, a graph generation unit 130, a reference pattern generation unit 140, and a matching unit 150.

The storage unit 110 stores logfiles 111a, 111b, . . . , graph datasets 112a, 112b, . . . , and reference patterns 113a, 113b, . . . . Each logfile 111a, 111b, . . . contains a collection of history records indicating what were done in servers 31, 32, 33, . . . on a daily basis. The graph datasets 112a, 112b, . . . indicates daily transaction pattern or communication pattern in the form of graphs. The reference patterns 113a, 113b, . . . are graphs prepared for fraud detection. For example, this storage unit 110 may be implemented as part of the memory 102 or storage device 103.

The log collection unit 120 collects logfiles from individual servers 31, 32, 33, . . . and enters them into the storage unit 110. For example, the log collection unit 120 collects daily logs of those servers 31, 32, 33, . . . at a predetermined time of day.

The graph generation unit 130 generates a daily graph from each logfile 111a, 111b, . . . stored in the storage unit 110. For example, the graph generation unit 130 retrieves from the storage unit 110 a set of log records collected in a single day and extracts elements out of the retrieved records so as to form the nodes of a graph. What is extracted as nodal elements may be, for example, IP addresses and account numbers. The graph generation unit 130 then generates nodes corresponding to the extracted elements.

Subsequently the graph generation unit 130 determines relationships among nodal elements by analyzing their source log records. For example, in the case where the nodes represent IP addresses, the graph generation unit 130 determines whether there is a log record that indicates a communication event between two servers. If such a record is found, then the graph generation unit 130 recognizes it as a relationship between two nodal elements (i.e., between two IP addresses of these two communicating servers). In the case where the nodes represent bank account numbers, the graph generation unit 130 determines whether there is a log record that indicates a money remittance between two bank accounts. If such a record is found, then the graph generation unit 130 recognizes it as a relationship between two nodal elements (i.e., between two account numbers involved in the remittance). With these element-to-element relationships, the graph generation unit 130 draws edges to connect the nodes corresponding to the related elements.

A graph is generated by placing nodes and connecting them with edges in the way described above. The graph generation unit 130 stores each generated graph into the storage unit 110. The stored graph datasets 112a, 112b, . . . may be labeled by the operator of the monitoring apparatus 100. For example, the labels may indicate whether the servers experienced a fraudulent event.

The reference pattern generation unit 140 generates a reference pattern on the basis of a set of graphs having identical labels. For example, the reference pattern generation unit 140 retrieves a set of graphs whose labels read "fraudulent event" and discovers frequent graphs commonly seen in them. The reference pattern generation unit 140 stored these frequent graphs in the storage unit 110 for use as reference patterns.

When the graph generation unit 130 generates a new graph, the matching unit 150 compares it with each reference pattern 113a, 113b, . . . stored in the storage unit 110 and outputs a matching result. Suppose, for example, the reference patterns 113a, 113b, . . . represent certain characteristics of graphs generated in the past days having fraudulent event records. The matching unit 150 investigates a given graph to seek subgraphs that match with any of the reference patterns 113a, 113b, . . . in the storage unit 110. If the number of matches reaches a specified threshold, the matching unit 150 outputs a message on the monitor 21 to indicate a possibility of frauds or the like.

It is noted that the lines interconnecting functional blocks in FIG. 6 represent some of their communication paths. The person skilled in the art would appreciate that there may be other communication paths in actual implementations. The illustrated functional blocks may be implemented as program modules of a computer.

The description now turns to the details of what is stored in the storage unit 110. FIG. 7 illustrates an example of logfiles. The illustrated logfiles 111a, 111b, . . . contain a plurality of log messages with time codes, as well as the source server name and collection date. In the case of bank transaction logs, each log message contains a source account number, a destination account number, the amount of remittance, and the like.

FIG. 8 illustrates an example of graph datasets. The illustrated graph datasets 112a, 112b, . . . include a date field and label field in its topmost part. The date field indicates on what date their respective source logs were collected, and the label field describes whether a fraudulent event was encountered in that collection date. The illustrated graph datasets 112a, 112b, . . . also include a matrix to define their respective graph structures. Both the rows and columns of this matrix are associated with nodes in the corresponding graph. In the example of FIG. 8, one graph dataset 112a represents a graph formed from six nodes with identifiers "P1" to "P6." Each intersection of a row and a column contains a value indicating whether the node corresponding to the row has a connection (i.e., edge) with the node corresponding to the column. For example, the intersectional cells may contain "1" to indicate presence of a connection or "0" to indicate absence of connections. The graph datasets 112a, 112b, . . . thus enable the monitoring apparatus 100 to generate graphs on a daily basis.

FIG. 9 illustrates an example of reference patterns. The illustrated reference patterns 113a, 113b, . . . have the same labels as their respective source graph datasets. Each reference pattern 113a, 113b, . . . indicates the likelihood of node-to-node connections in the form of a matrix. Both the rows and columns of this matrix are associated with nodes included in the reference pattern. In the example of FIG. 9, the illustrated reference pattern 113a includes three nodes with respective identifiers "Q1," "Q2," and "Q3." Each intersection of a row and a column contains a value indicating the likelihood of a connection between the node corresponding to the row and the node corresponding to the column.

The above-described monitoring apparatus 100 generates reference patterns and examines a given graph with respect to them. The following section will describe in detail what the monitoring apparatus 100 actually performs in these processes.

Figure 10:
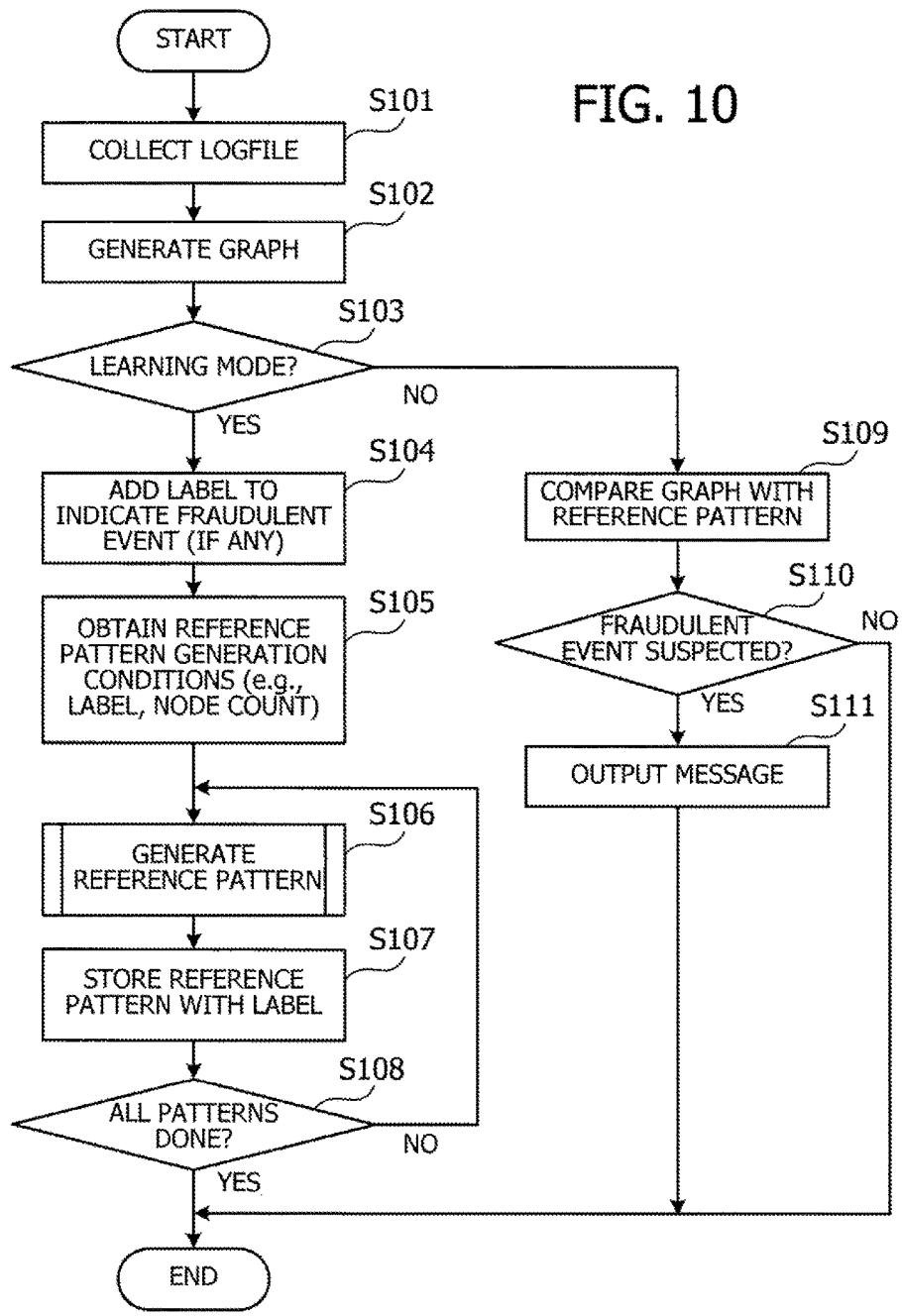
FIG. 10 is a flowchart illustrating a process executed by the proposed monitoring apparatus.

FIG. 10 is a flowchart illustrating a process executed by the proposed monitoring apparatus. Each operation in FIG. 10 is described below in the order of step numbers.

(Step S101) The log collection unit 120 collects logfiles 111a, 111b, . . . from servers 31, 32, 33, . . . and enters the collected logfiles into the storage unit 110.

(Step S102) The graph generation unit 130 generates a graph at predetermined intervals (e.g., daily) to express a processing pattern (e.g., of communication between servers or of transactions between bank accounts) suggested by the logfiles collected in each period. The graph generation unit 130 enters the resulting graph datasets 112a, 112b, . . . into the storage unit 110.

(Step S103) The reference pattern generation unit 140 determines the current operation mode of the monitoring apparatus 100. The monitoring apparatus 100 may operate in, for example, learning mode or fraud detection mode. In learning mode, the monitoring apparatus 100 generates reference patterns from given graphs. In fraud detection mode, the monitoring apparatus 100 compares a generated graph with the existing reference patterns, thus determining whether any possible fraudulent activity took place. Which operation mode to use is specified to the monitoring apparatus 100 by its administrator. When it is learning mode, the process advances to step S104. When it is fraud detection mode, the process goes to step S109.

(Step S104) The reference pattern generation unit 140 adds a label to each generated graph dataset 112a, 112b, . . . to indicate presence of a fraudulent event (or absence of the same) according to instructions from the administrator.

(Step S105) The reference pattern generation unit 140 obtains reference pattern generation conditions, such as those specified by the administrator, for example. Specifically, reference pattern generation conditions may specify what label is used to generate reference patterns, how many nodes each reference pattern is to include, and how many reference patterns are expected. For example, they may specify a plurality of reference patterns each composed of three nodes. They may also specify reference patterns having different numbers of nodes.

(Step S106) The reference pattern generation unit 140 calls a process of generating reference patterns in accordance with the obtained reference pattern generation conditions. The details of this process will be described later with reference to FIG. 17.

(Step S107) The reference pattern generation unit 140 stores the generated reference patterns in the storage unit 110, together with the specified label. In this step, the reference pattern generation unit 140 may also store subgraph datasets in the storage unit 110 to record which subgraphs are used in the process of generating reference patterns.

(Step S108) The reference pattern generation unit determines whether the reference pattern generation unit 140 has generated all reference patterns as specified by the given reference pattern generation conditions. If the conditions specify more reference patterns, the process returns to step S106. If all reference patterns are done, the process of FIG. 10 is terminated.

(Step S109) In fraud detection mode, the matching unit 150 compares the generated graph with reference patterns labeled "fraudulent event." For example, the matching unit 150 searches the graph for a subgraph that bears a specified degree of similarity with one of such reference patterns. For example, the cosine similarity may be calculated as a measure of similarity in this step.

(Step S110) Based on the result of matching, the matching unit 150 determines whether there is a possibility of a fraudulent event on the day corresponding to the source graph. For example, the matching unit 150 detects such a possibility when the number of matching subgraphs reaches a specified threshold. If a fraudulent event is suspected, the process advances to step S111. Otherwise, the process of FIG. 10 is terminated.

(Step S111) The matching unit 150 outputs a warning message that indicates a possibility of a fraudulent event and terminates the process of FIG. 10.

The above description has outlined how the monitoring apparatus 100 generates reference patterns and detects a fraudulent event by using those patterns. The monitoring apparatus 100 generates reference patterns in a practically reasonable time even if the source graphs have 10,000 or more nodes.

The monitoring apparatus 100 has a reference pattern generation unit 140 that generates reference patterns by efficiently identifying frequent graphs in a plurality of source graphs. Specifically, the reference pattern generation unit 140 samples subgraphs that have as many nodes as supposed be in reference patterns. The reference pattern generation unit 140 generates an initial version of a reference pattern by giving a fixed node order to the extracted subgraphs and generating a graph that represents average connections. The reference pattern generation unit 140 then repeats the cycle of swapping nodes in subgraphs and calculating probability that nodes may be connected in the reference pattern, such that the subgraphs become more similar to the pattern.

Figure 11:
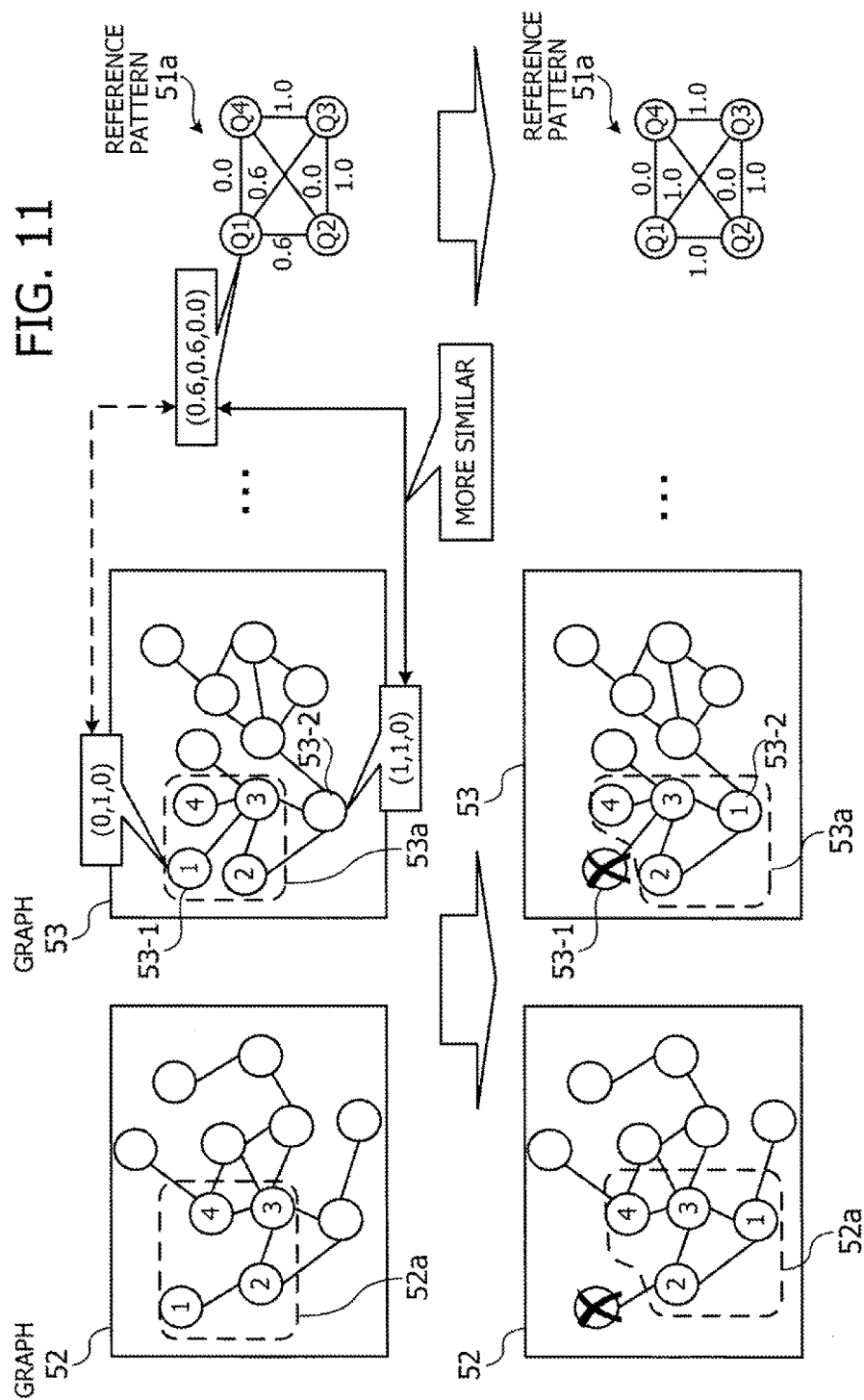
FIG. 11 illustrates an example of node swapping in a subgraph and probability re-calculation for node-to-node connections in a reference pattern.

FIG. 11 illustrates an example of node swapping in a subgraph and probability re-calculation for node-to-node connections in a reference pattern. This example illustrates the case of generating a reference pattern 51a with four nodes. Specifically, some subgraphs have been extracted from given graphs 52, 53, . . . , each subgraph having as many nodes as the reference pattern 51a in process. For example, subgraphs 52a and 53a are extracted from graphs 52 and 53, respectively. The nodes in these subgraphs 52a and 53a are sequentially numbered as indicated by the circled numerals in FIG. 11. Note that two or more such subgraphs may be extracted from each source graph.

Referring to the upper half of FIG. 11, the illustrated reference pattern 51a is based on the subgraphs extracted from the source graphs 52, 53, . . . , and its constituent nodes are numbered as in the extracted subgraphs. For example, the node identifiers "Q1" to "Q4" include numerals that indicate the order. Each node-connecting edge in the reference pattern 51a is assigned a certain value representing the probability that the end nodes of the edge are connected in subgraphs. For example, the edge between nodes "Q1" and "Q2" has a value of 0.6 in FIG. 11. This means that the first node (node "1") may be connected to the second node (node "2") in subgraphs with a probability of 60%.

Now that the initial version of the reference pattern 51a has been generated, the reference pattern generation unit 140 then tries node swapping in the individual subgraphs 52a and 53a such that they will be more similar to the reference pattern 51a. For example, the reference pattern generation unit 140 selects a node in one subgraph 52a and determines whether the similarity between the subgraph 52a and the reference pattern 51a will increase if the selected node is swapped with another node. The reference pattern generation unit 140 also does the same for another subgraph 53a. When such node swapping makes a subgraph more similar to the reference pattern 51a, the reference pattern generation unit 140 swaps them to change the constituent nodes of the subgraph. What is swapped with the selected node is, for example, a node in the subgraph to which the selected node belongs or a node that sits outside the subgraph and is connected to any one of the nodes in the subgraph. Note that a source graph may have two or more similarity-increasing nodes. In that case, the reference pattern generation unit 140 determines which one of such nodes gives the highest similarity and swaps the selected node with that node.

Suppose, for example, that the reference pattern generation unit 140 has selected the first node 53-1 out of four nodes in the subgraph 53a. Connections from the selected node 53-1 to other nodes in the subgraph 53a are expressed in the form of a vector (0, 1, 0). This vector (0, 1, 0) denotes that the selected node 53-1 has a connection with the third node in the subgraph 53a, but has no connections with the second node or fourth node.

The reference pattern 51a includes node "Q1" in the first place, whose connections to other nodes in the reference pattern 51a is represented as (0.6, 0.6, 0.0). This vector means that node "Q1" may have a connection to each of the second node "Q2" and third node "Q3" with a probability of 0.6, while it has no connection with the fourth node "Q4."

The reference pattern generation unit 140 now calculates similarity between the above vector of the first node 53-a in the subgraph 53a and that of the first node in the reference pattern 51a to evaluate how these two nodes resemble with each other. For example, the cosine similarity may be used as a measure of similarity between these vectors.

The reference pattern generation unit 140 investigates whether the similarity in question will increase if the node 53-1 currently in the first place in the subgraph 53a is swapped with an external node 53-2 connected to both the second and third nodes in the subgraph 53a. Suppose now that the node 53-2 becomes the first node in the subgraph 53a. Then this new first node 53-2 will have a vector value of (1, 1, 0).

The difference between the above-described two vectors (0, 1, 0) and (1, 1, 0) lies in their first component representing a connection (or the lack thereof) to the second node. The first node in the reference pattern 51a has a vector of (0.6, 0.6, 0.0), and its first component has a value of 0.6. This means that vector (1, 1, 0) of the external node 53-2 is closer to the reference pattern 51a than that of the selected node 53-1. That is, the node 53-2 increases the similarity. Accordingly, the reference pattern generation unit 140 updates the subgraph 53a by using the external node 53-2 as changing its first node from the node 53-1 to the node 53-2.

The reference pattern generation unit 140 also applies the same logic to another subgraph 52a, thus swapping nodes to make it more similar to the reference pattern 51a. After swapping subgraph nodes, the reference pattern generation unit 140 re-calculates probabilities of node-to-node connections in the reference pattern 51a. Referring to the updated subgraphs 52a and 53a seen in the lower half of FIG. 11, their new first nodes have connections to the second and third nodes, but not for the fourth node. As a result of such repetitive node-ordering swap operations, the reference pattern 51a obtains a connection between the first node and second node, as well as between the first node and third node, with a probability of about one.

As can be seen from the above description, the reference pattern generation unit 140 is designed to repeat node-ordering swap operations with each node in subgraphs 52a and 53a such that their average connection pattern (reference pattern) will have more similar connections to those of the subgraphs 52a and 53a when their nodes are compared according to the order of nodes (i.e., which node positions the nodes are placed in). The probability of a connection in the reference pattern 51a thus approaches either one or zero as the node-ordering swap operations are repeated. When similarity-increasing nodes are exhausted, the reference pattern generation unit 140 enters the final version of the reference pattern 51a into the storage unit 110.

In the actual implementation, the reference pattern generation unit 140 uses matrixes when swapping nodes in subgraphs 52a and 53a and also when recalculating probabilities of node-to-node connections in a reference pattern 51a. The subgraphs 52a and 53a are also expressed in matrix form.

Figure 12:
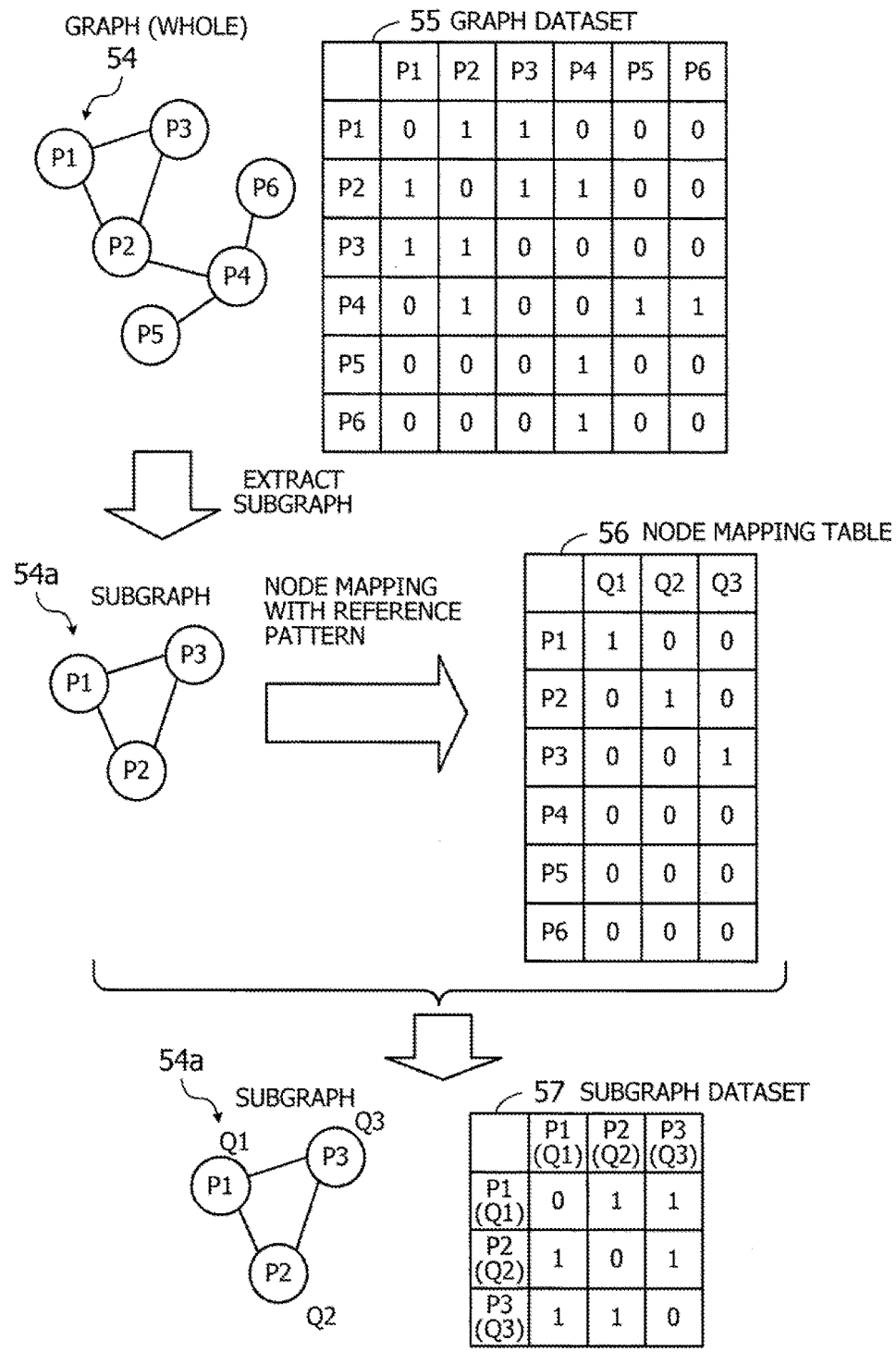
FIG. 12 illustrates an example of extracting a subgraph using matrixes.

FIG. 12 illustrates an example of extracting a subgraph using matrixes. The storage unit 110 stores a graph dataset 55 that represents a graph 54 in the form of a matrix representing node-to-node connections. The reference pattern generation unit 140 extracts a subgraph 54a from the graph 54 and assigns a sequential order to its constituent nodes, thus establishing node-to-node mapping between the subgraph 54a and a reference pattern. In the example of FIG. 12, node "P1" in the subgraph 54a is in the first place, node "P2" is in the second place, and node "P3" is in the third place.

The reference pattern generation unit 140 generates a node mapping table 56 on the basis of nodes and their order in the subgraph 54a. The row headers of this node mapping table 56 contain identifiers of nodes in the source graph 54, and the column headers contain identifiers of nodes in the reference pattern. Each intersection of a row and a column contains a specific value that indicates a mapping relationship between the corresponding nodes. In the example of FIG. 12, the intersection contains a value of one when two nodes are mapped to each other and a value of zero when two nodes are unrelated.

Referring to the illustrated node mapping table 56, the rows correspond to the first node "P1" to fifth node "P5" in the source graph 54 (and partly in the subgraph 54a), and the columns correspond to the first node "Q1" to third node "Q3" in the reference pattern. A value of one is seen at the intersection of the row of node "P1" and the column of node "Q1" in this node mapping table 56. The same is true for the intersection of the row of node "P2" and the column of node "Q2," as well as for the intersection of the row of node "P3" and column of node "Q3." All the other intersections, or cells, of the node mapping table 56 contain zeros.

Based on the node mapping table 56 described above, the reference pattern generation unit 140 generates a subgraph dataset 57 that indicates mapping relationships of nodes between the subgraph 54a and reference pattern, together with node-to-node connections within the subgraph 54a. Both the row headers and column headers of this subgraph dataset 57 contain a pair of node identifiers, one indicating a node in the subgraph 54a and the other indicating its corresponding node in the reference pattern. Each intersection of a row and a column contains a value of one or zero that indicates whether the subgraph 54a includes a connection (edge) between two nodes respectively corresponding to the row and the column. For example, a value of one means the presence of a connection, and a value of zero indicates the absence of a connection.

The proposed monitoring apparatus 100 extracts subgraphs from each source graph that has a label specified by a reference pattern generation condition and generates subgraph datasets in the way discussed in FIG. 12 to represent individual subgraphs. The monitoring apparatus 100 then generates a reference pattern on the basis of the subgraph datasets.

Figure 13:
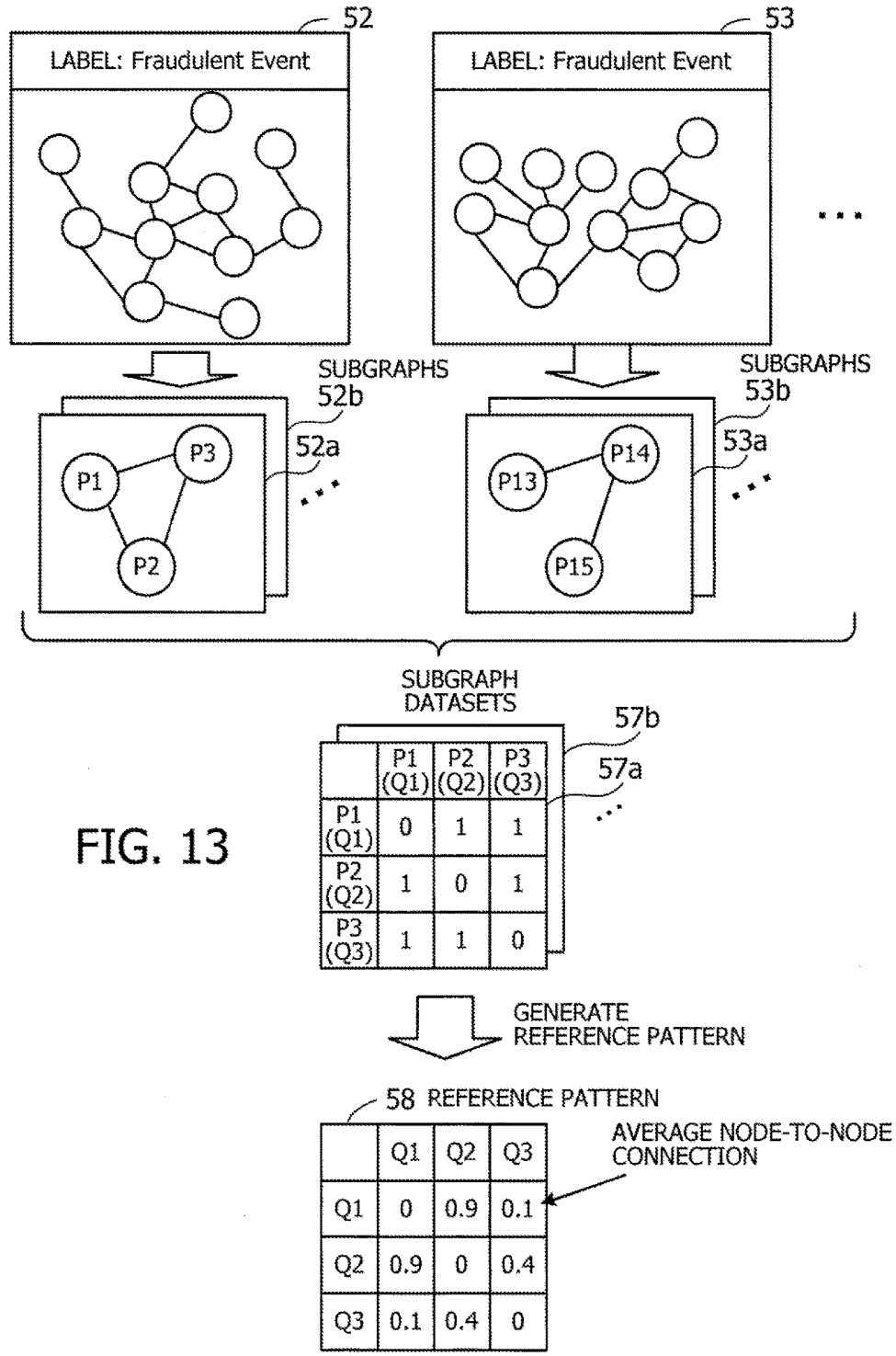
FIG. 13 illustrates an example of reference pattern generation.

FIG. 13 illustrates an example of reference pattern generation. In this example, subgraphs 52a, 52b, . . . , 53a, 53b, . . . have been extracted from a plurality of source graphs 52, 53, . . . having a label of "fraudulent event." The nodes in each extracted subgraph are numbered in a specific order, and subgraph datasets 57a, 57b, . . . are generated for the individual subgraphs. A reference pattern 58 is then generated from the subgraph datasets 57a, 57b, . . . by averaging the values of node-to-node connections in their corresponding cells.

The generated reference pattern 58 permits the reference pattern generation unit 140 to calculate similarity of nodes between a source graph and the reference pattern 58. This is actually done by generating a connection table from the graph dataset 55 and node mapping table 56, and then comparing the generated connection table with the reference pattern 58.

Figure 14:
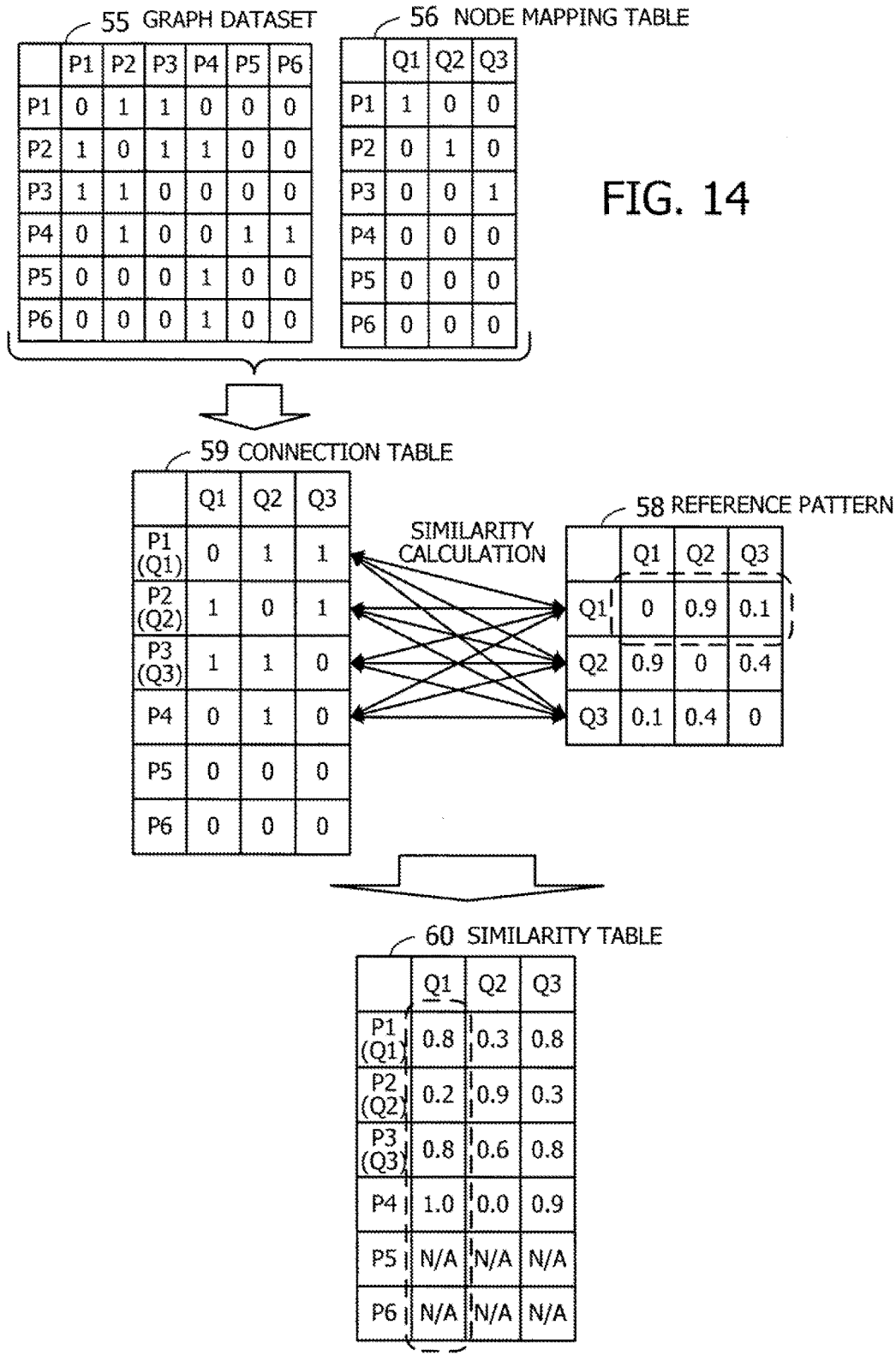
FIG. 14 illustrates an example of similarity calculation.

FIG. 14 illustrates an example of similarity calculation. The illustrated node mapping table 56 indicates that three nodes P1, P2, and P3 are mapped to the nodes Q1, Q2, and Q3 in the reference pattern 58. Accordingly, the reference pattern generation unit 140 extracts the columns of those nodes P1, P2, and P3 out of the graph dataset 55. The reference pattern generation unit 140 then generates a connection table 59 from the extracted columns, with additional identifiers in parentheses to indicate the corresponding nodes Q1, Q2, and Q3 in the reference pattern 58.

The reference pattern generation unit 140 now calculates similarity of row vectors between the connection table 59 and the reference pattern 58 and summarizes the result in the form of a similarity table 60. The graph dataset 55 in the example of FIG. 14 includes nodes P5 and P6, but these nodes are not subjected to node swapping or similarity calculation because of their lack of connection to nodes P1 to P3 in the subgraph of interest.

Figure 15:
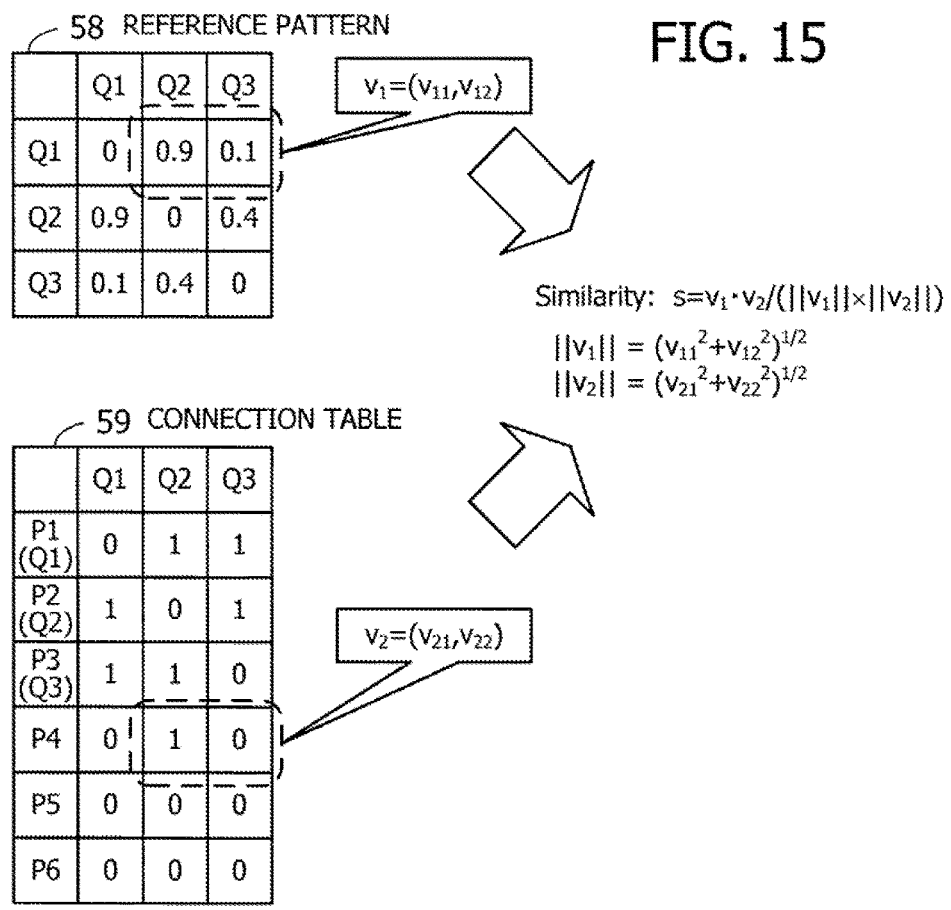
FIG. 15 illustrates how to calculate similarity between vectors.

For example, the reference pattern generation unit 140 may use the cosine similarity as a measure of similarity between vectors. FIG. 15 illustrates a method for calculating similarity between vectors. Suppose now that, for example, node Q1 in the reference pattern 58 and node P4 in the subgraph of interest are subjected to similarity calculation.

Let a vector $v_1 = (v_{11}, v_{12}, \ldots)$ represent connections of node Q1 to other nodes in the reference pattern 58. Also, let another vector $v_2 = (v_{21}, v_{22}, \ldots)$ represent connections of node P4 in the subgraph to other nodes than node Q1. The latter vector $v_2$ is obtained from the connection table 59.

Then the following equation (1) gives the similarity s between these two vectors.

$$s = v_1 \cdot v_2 / (\|v_1\| \times \|v_2\|) \quad (1)$$

where the dot (".") denotes the inner product of vectors, and the symbol $\|v\|$ represents the length of a vector. Specifically, the inner product $v_1 \cdot v_2$ is calculated as follows:

$$v_1 \cdot v_2 = v_{11} \times v_{21} + v_{12} \times v_{22} + \ldots \quad (2)$$

The vector lengths $\|v_1\|$ and $\|v_2\|$ are calculated as follows:

$$\|v_1\| = (v_{11}^2 + v_{12}^2 + \ldots)^{1/2} \quad (3)$$

$$\|v_2\| = (v_{21}^2 + v_{22}^2 + \ldots)^{1/2} \quad (4)$$

Note that no similarity can be defined if $\|v_1\| = 0$ or $\|v_2\| = 0$. This may happen when one of the compared nodes has no connections with other nodes.

Figure 16:
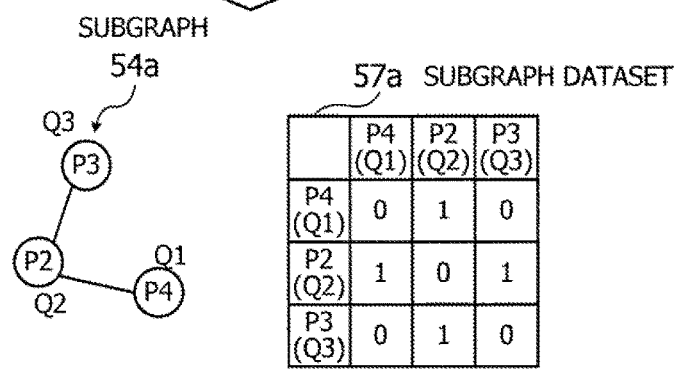
FIG. 16 illustrates an example of node swapping.

The resulting values of similarity are compiled into a similarity table 60 (FIG. 14). This similarity table 60 enables the reference pattern generation unit 140 to determine whether to swap a node in the subgraph with some other node. FIG. 16 illustrates an example of node swapping. Node Q1 in the reference pattern 58 currently corresponds to node P1 in the subgraph 54a as discussed in FIGS. 12 to 14, and the reference pattern generation unit 140 now determines whether to swap this node P1 with another node. Referring to FIG. 16, the similarity between node P1 and node Q1 is evaluated to be 0.8 as seen in the similarity table 60. The similarity table 60 also indicates that node P4 has a similarity of 1.0 with respect to node Q1. This fact suggests that the similarity to node Q1 will increase if node P1 is swapped with node P4.

In view of the above, the reference pattern generation unit 140 changes the first node in the subgraph 54a from node P1 to node P4. More specifically, the reference pattern generation unit 140 modifies the node mapping table 56 by entering one to the cell of row "P4" and column "Q1" while clearing the cell of row "P1" and column "Q1" to zero. As a result of this modification, the subgraph 54a is now formed from nodes P4, P2, and P3 in that order. The subgraph dataset 57a and connection table 59 are also updated accordingly.

The probabilities of node-to-node connections are calculated from subgraph datasets 57a, 57b, . . . as in the reference pattern 58 of FIG. 13. This means that the elements of the reference pattern 58 are re-calculated when even a single change of connection is made to the subgraph datasets 57a, 57b, . . . as in the above example. The re-calculated probabilities of node-to-node connections further affect the calculation of similarity of nodes between a subgraph and the reference pattern 58 discussed in FIG. 14.

The reference pattern generation unit 140 alternately executes node swapping in a subgraph and updating of the reference pattern 58, thus causing multiple subgraphs to converge into a single set of connections. In other words, the individual probability values of node-to-node connections approach to zero or one in the reference pattern 58. The reference pattern 58 is finalized when all possible similarity-increasing nodes are exhausted.

Figure 17:
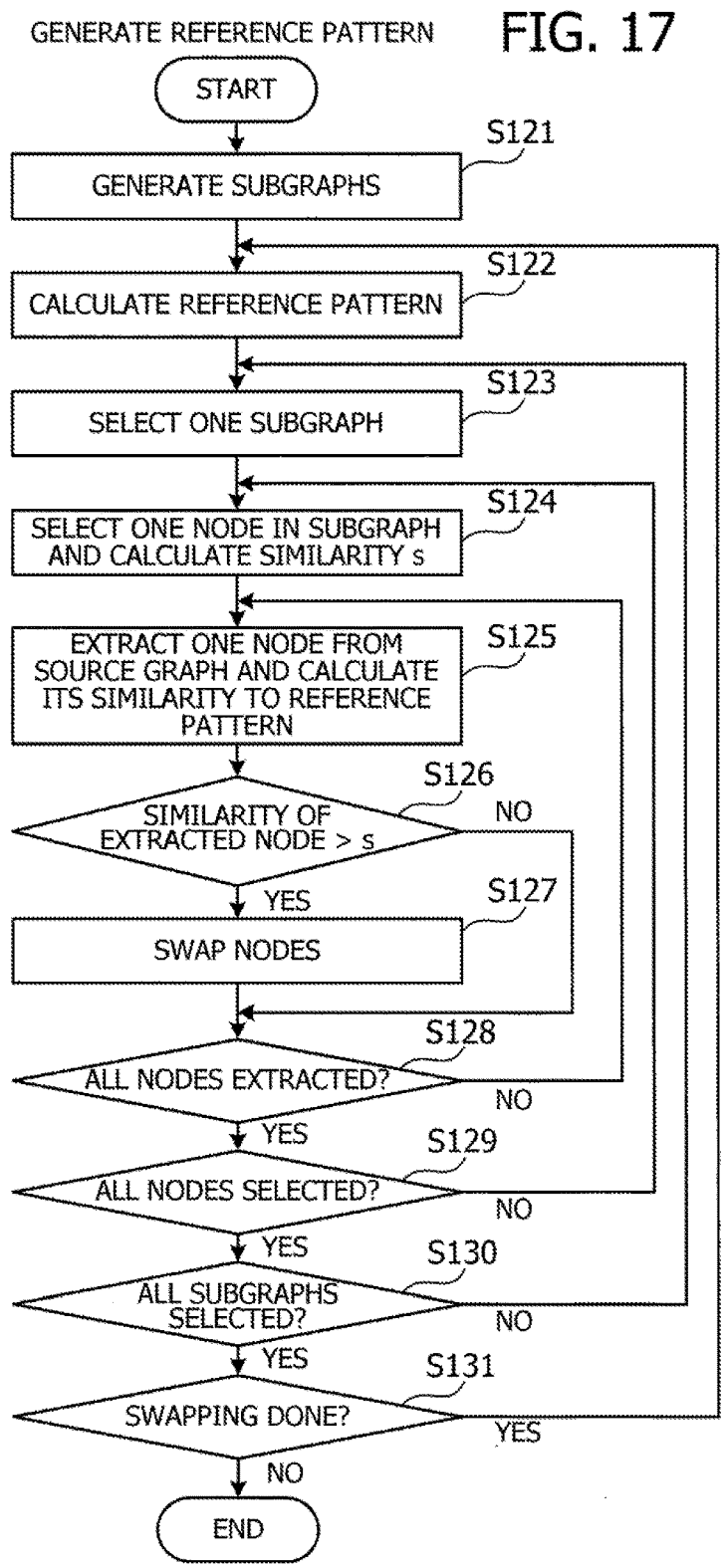
FIG. 17 is a flowchart illustrating an exemplary process of generating reference patterns.

A specific procedure of reference pattern generation will now be described below. FIG. 17 is a flowchart illustrating an exemplary process of generating reference patterns. Each operation in FIG. 17 is described below in the order of step numbers.

(Step S121) The reference pattern generation unit 140 generates a plurality of subgraphs through a random sampling process to extract nodes out of a plurality of source graphs with a specified label.

(Step S122) Based on the subgraphs generated above, the reference pattern generation unit 140 calculates a reference pattern.

(Step S123) The reference pattern generation unit 140 selects one of the subgraphs.

(Step S124) The reference pattern generation unit 140 selects one of the nodes in the selected subgraph. The reference pattern generation unit 140 then calculates the degree of similarity (variable s) between the selected node and its corresponding node in the reference pattern.

(Step S125) The reference pattern generation unit 140 extracts a node from the source graph of the selected subgraph. The reference pattern generation unit 140 then calculates similarity between the extracted source-graph node and a node in the reference pattern that corresponds to the subgraph node selected in step S124.

(Step S126) The reference pattern generation unit 140 determines whether the similarity calculated in step S125 is greater than the similarity s calculated in step S124. If the former similarity is greater than the latter similarity s, the process advances to step S127. Otherwise, the process skips to step S128.

(Step S127) The reference pattern generation unit 140 swaps the subgraph node selected in step S124 with the source-graph node extracted in step S125, thus revising the subgraph selected in step S123.

(Step S128) The reference pattern generation unit 140 determines whether it has extracted all nodes in the source graph corresponding to the selected subgraph. When there is any pending node, the process returns to step S125. When all the nodes are extracted, the process advances to step S129.

(Step S129) The reference pattern generation unit 140 determines whether it has selected all nodes in the subgraph selected in step S123. When there is any pending node, the process returns to step S124. When all the nodes are selected, the process advances to step S130.

(Step S130) The reference pattern generation unit 140 determines whether it has selected all subgraphs. When there is any pending subgraph, the process returns to step S123. When all the subgraphs are selected, the process advances to step S131.

(Step S131) The reference pattern generation unit 140 determines whether the last round of steps S123 to S130 has done at least one instance of node swapping. If node swapping is done, the process returns to step S122. If no node swapping is done, then the reference pattern generation unit 140 stores the final reference pattern into the storage unit 110 and terminates this reference pattern generation process of FIG. 17.

The reference pattern generation unit 140 executes the above process of FIG. 17 to generate a reference pattern. According to the second embodiment, the similarity calculation is repeated as many times as the number of nodes in the source graph multiplied by the number of nodes in a subgraph, thus avoiding combinatorial explosions (i.e., explosive increase of combinations) during the course of comparison. That is, the second embodiment avoids increasing loads of similarity calculation. The second embodiment also swaps nodes to make subgraphs approach to a frequency graph, thus making it possible to discover a hidden frequent graph that may be overlooked in conventional sampling of subgraphs.

(c) Third Embodiment

This part describes a third embodiment, which introduces ambiguity or flexibility into the mapping of node orders by using probabilities to represent node-to-node relationships between subgraphs and their source graphs, thereby making it easy to revise a subgraph by changing the node order. That is, it could be hard for the foregoing second embodiment to find frequent graphs because of the fixed order of nodes. The third embodiment solves this difficulty in the frequent graph search. As an introduction, the following section describes the noted difficulty of the second embodiment.

Figure 18:
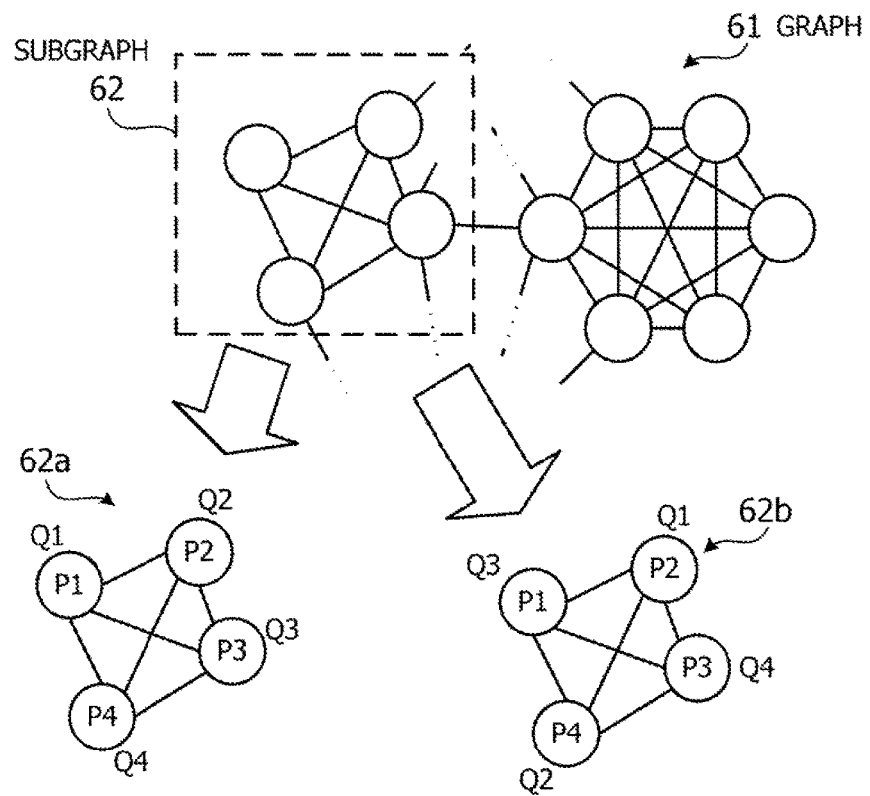
FIG. 18 illustrates an exemplary case in which a frequent graph is discovered easily even if the order of nodes is fixed.

FIG. 18 illustrates an example of the case in which a frequent graph is found easily even if the order of nodes is fixed. The illustrated graph 61 has dense connections from one node to another. It is therefore likely that a subgraph 62 extracted from the graph 61 will also have dense node-to-node connections.

Suppose now that the nodes in the subgraph 62 are arranged in two different ways as seen in subgraphs 62*a* and 62*b* in the middle part of FIG. 18. One subgraph 62*a* has its nodes P1, P2, P3, and P4 in that order (i.e., nodes P1, P2, P3, and P4 are respectively mapped to Q1, Q2, Q3, and Q4). The other subgraph 62*b* arranges the same set of nodes in the order of P2, P4, P1, and P3 for mapping to Q1, Q2, Q3, and Q4.

The bottom part of FIG. 18 demonstrates that the two resulting subgraph datasets 63*a* and 63*b* contain the same or similar values however their nodes are arranged in different orders. This is because their nodes are densely connected. That is, the subgraph 62 would surely be discovered as a frequent graph regardless of its node mapping order. In other words, the node mapping order is not critical for successful frequent graph discovery with such subgraphs.

Figure 19:
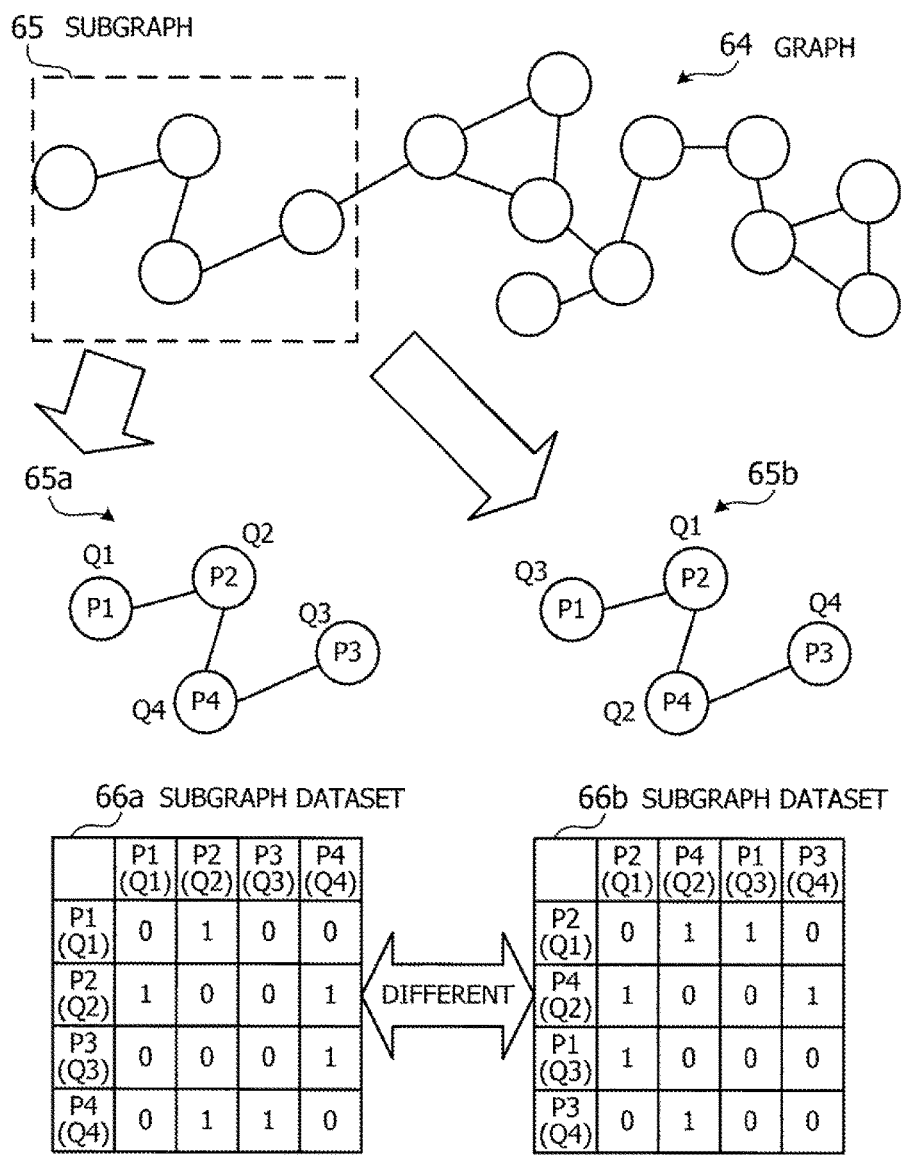
FIG. 19 illustrates an exemplary case in which it would be difficult to find a frequent graph if the order of nodes is fixed.

FIG. 19 illustrates an example of the case in which it would be difficult to find a frequent graph if the order of nodes is fixed. In contrast to the graph 61 discussed in FIG. 18, the illustrated graph 64 has sparse connections between nodes. It is therefore likely that a subgraph 65 extracted from the graph 64 will also have sparse node-to-node connections.

Suppose now that the nodes in the subgraph 65 are arranged in two different ways as seen in subgraphs 65*a* and 65*b* in the middle part of FIG. 19. One subgraph 65*a* has its nodes P1, P2, P3, and P4 in that order (i.e., nodes P1, P2, P3, and P4 are respectively mapped to Q1, Q2, Q3, and Q4). The other subgraph 65*b* arranges the same set of nodes in the order of P2, P4, P1, and P3 for mapping to Q1, Q2, Q3, and Q4.

The bottom part of FIG. 19 demonstrates that the two resulting subgraph datasets 66*a* and 66*b* contain different values depending on their node mapping orders, due to the fact that their nodes are sparsely connected. In other words, the node mapping order in the subgraph 65 is critical for successful frequent graph discovery.

Suppose, for example, that the reference pattern generation unit 140 recognizes a certain subgraph resembling the former subgraph 65*a* as a frequent graph since the source graphs contain many such subgraphs. However, if the nodes in the subgraph 65 were mapped as in the latter subgraph 65*b*, the reference pattern generation unit 140 would recognize that the subgraph 65 in question was different from the frequent graph because their subgraph datasets indicate quite different patterns of node connections. The node mapping order of the noted subgraph may hopefully become close to the frequent graph 65*a* through the process of node swapping, but this would not always be the case.

As can be seen from the above discussion, the fixed-order policy in node mapping may cause the reference pattern generation unit 140 to mistakenly detect differences between subgraphs, thus making it difficult to revise those subgraphs and bring them close to the frequent graph or reference pattern. In view of this problem, the third embodiment proposes that the reference pattern generation unit 140 uses the probability to represent node-to-node mapping relationships between a reference pattern and an extracted subgraph, so that the node mapping order may be determined ambiguously. For the purpose of ambiguity in node order, the reference pattern generation unit 140 generates a node mapping probability table to describe the probability that each node in the source graph is included in the subgraph of interest and also mapped to one of the nodes in the reference pattern being compared with. Then, based on this node mapping probability table, the reference pattern generation unit 140 calculates expected values that represent how each node in the source graph is likely to have a connection to a node corresponding one of the nodes in the reference pattern.

Figure 20:
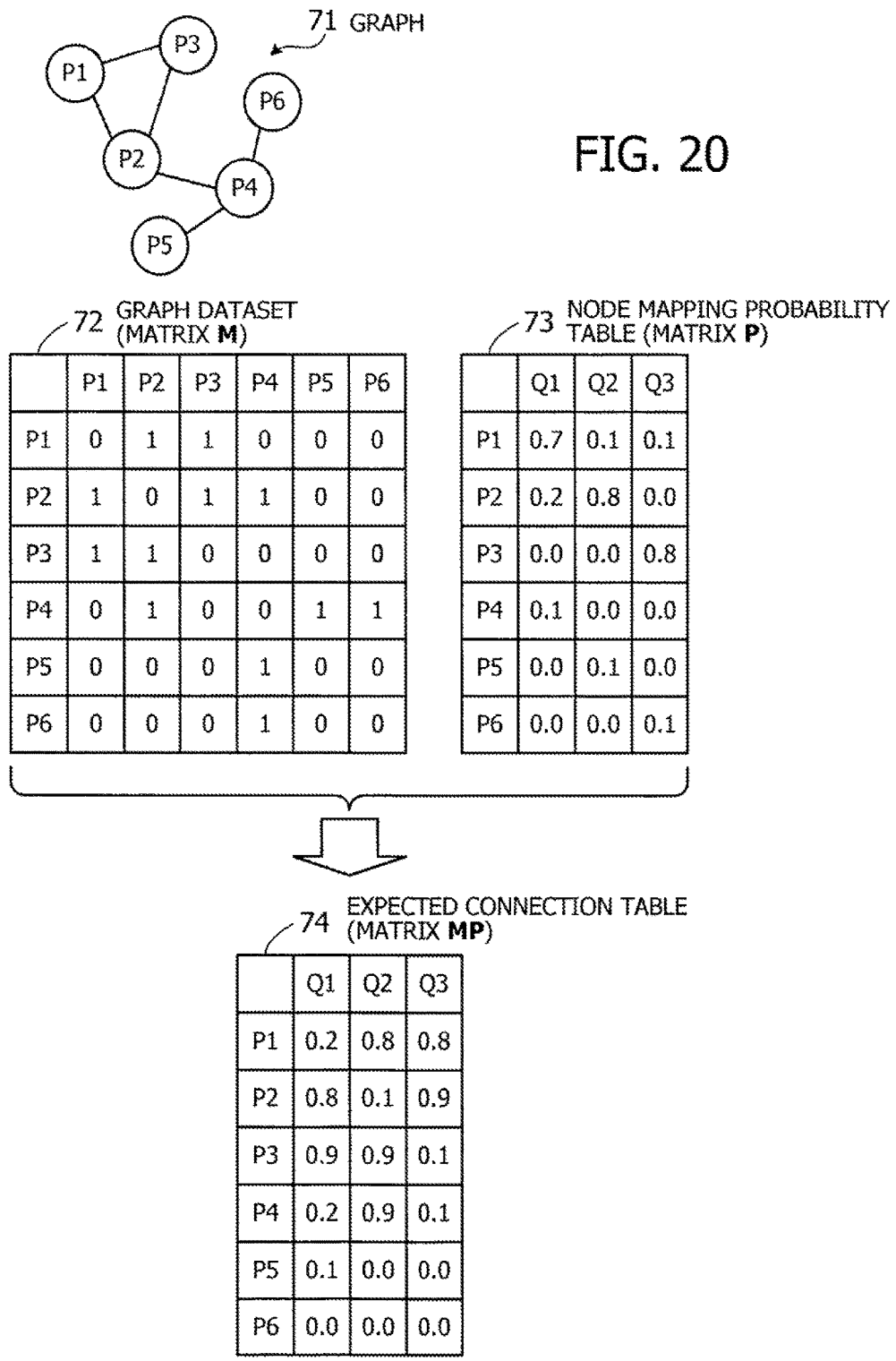
FIG. 20 illustrates an example of a node mapping probability table and expected values of node-to-node connections.

FIG. 20 illustrates an example of a node mapping probability table and expected values of node-to-node connections. The illustrated graph dataset 72 describes node-to-node connections seen in an exemplary graph 71. This array of data is referred to as matrix M. The reference pattern generation unit 140 is now to generate a reference pattern with three nodes Q1, Q2, and Q3. To this end, the reference pattern generation unit 140 first generates a node mapping probability table 73 to describe the probability that each node in the graph 71 may be mapped to node Q1, Q2, or Q3 in the reference pattern.

The node mapping probability table 73 has row headers containing the identifier of each node in the source graph 71 and column headers containing the identifier of each node in the reference pattern. Each intersection of a row and a column contains a value indicating the likelihood of a connection between the source-graph node corresponding to the row and the reference-pattern node corresponding to the column. The probability values seen in each column amount to one (e.g., 0.7+0.2+0.0+0.1+0.0+0.0=1.0). For example, the node mapping probability table 73 may begin with any initial values, and the reference pattern generation unit 140 revises it on the basis of actual node-to-node connections in given graphs. The resulting array of probabilities in the node mapping probability table 73 is referred to as matrix P.

Based on the graph dataset 72 and node mapping probability table 73, the reference pattern generation unit 140 calculates expected values that represent how each node in the graph 71 is expected to have a connection to nodes in the reference pattern. For example, node P1 is connected to nodes P2 and P3 in the illustrated graph 71. This means that the expected value of node P1 having a connection to node Q1 in the reference pattern equals to the probability that either node P2 or node P3 is mapped to node Q1. Referring to the example of FIG. 20, node P2 may be mapped to node Q1 with a probability of 0.2, whereas node P3 may be mapped to node Q1 with a probability of zero. Accordingly the expected value of node P1 having a connection to node Q1 is thus calculated to be 0.2 (=0.2+0.0).

The expected values calculated above are then compiled into an expected connection table 74. The expected connection table 74 has row headers containing the identifier of each node in the source graph 71 and column headers containing the identifier of each node in the reference pattern. Each intersection of a row and a column contains an expected value indicating the likelihood of a connection between the source-graph node corresponding to the row and the reference-pattern node corresponding to the column. These elements of the expected connection table 74 are obtained by multiplying matrix M by matrix P on the right. In other words, the expected values in the expected connection table 74 are expressed as a matrix multiplication MP.

Let us now think of generating a subgraph by mapping some source-graph nodes to reference-pattern nodes with the probabilities given in the node mapping probability table 73. The reference pattern generation unit 140 participates in this task by calculating expected values for node-to-node connections in the subgraph in question.

FIG. 21 illustrates an exemplary calculation of expected values of connections in a subgraph. Think of, for example, a subgraph 75 having three nodes Px, Py, and Pz. Node Px is mapped to node Q1 of the reference pattern. Node Py is mapped to node Q2 of the reference pattern. Node Pz is mapped to node Q3 of the reference pattern.

Node Px is selected out of nodes in the graph 71 according to the probabilities stored in column Q1 of the node mapping probability table 73. That is, node P1 may be selected with a probability of 0.7. Node P2 may be selected with a probability of 0.2. Node P4 may be selected with a probability of 0.1. Node Py is similarly selected out of those in the graph 71 according to the probabilities stored in column Q2 of the node mapping probability table 73. Further, node Pz is selected out of those in the graph 71 according to the probabilities stored in column Q3 of the node mapping probability table 73.

Under the above-described selection conditions for a subgraph 75, the reference pattern generation unit 140 calculates expected values representing existence of node-to-node connections. For example, node P1 is connected to node P2 in the illustrated graph 71. According to the node mapping probability table 73, node P1 is mapped to node Q1 in the reference pattern with a high probability, as is node P2 to node Q2. These facts suggest a large expected value with the connection between node Px and node Py in the subgraph 75, respectively corresponding to node Q1 and node Q2 in the reference pattern.

More specifically, expected values suggesting presence of node-to-node connections in the subgraph 75 are obtained by multiplying matrix M by transposed matrix $P^T$ on the left and by matrix P on the right. The obtained expected values are then compiled into a subgraph expected value table 76. The expected values represented by this subgraph expected value table 76 are given by a matrix multiplication $P^TMP$.

Such a subgraph expected value table is generated for each source graph having a label that is specified for reference pattern generation. The reference pattern generation unit 140 generates a reference pattern on the basis of these subgraph expected value tables.

Figure 22:
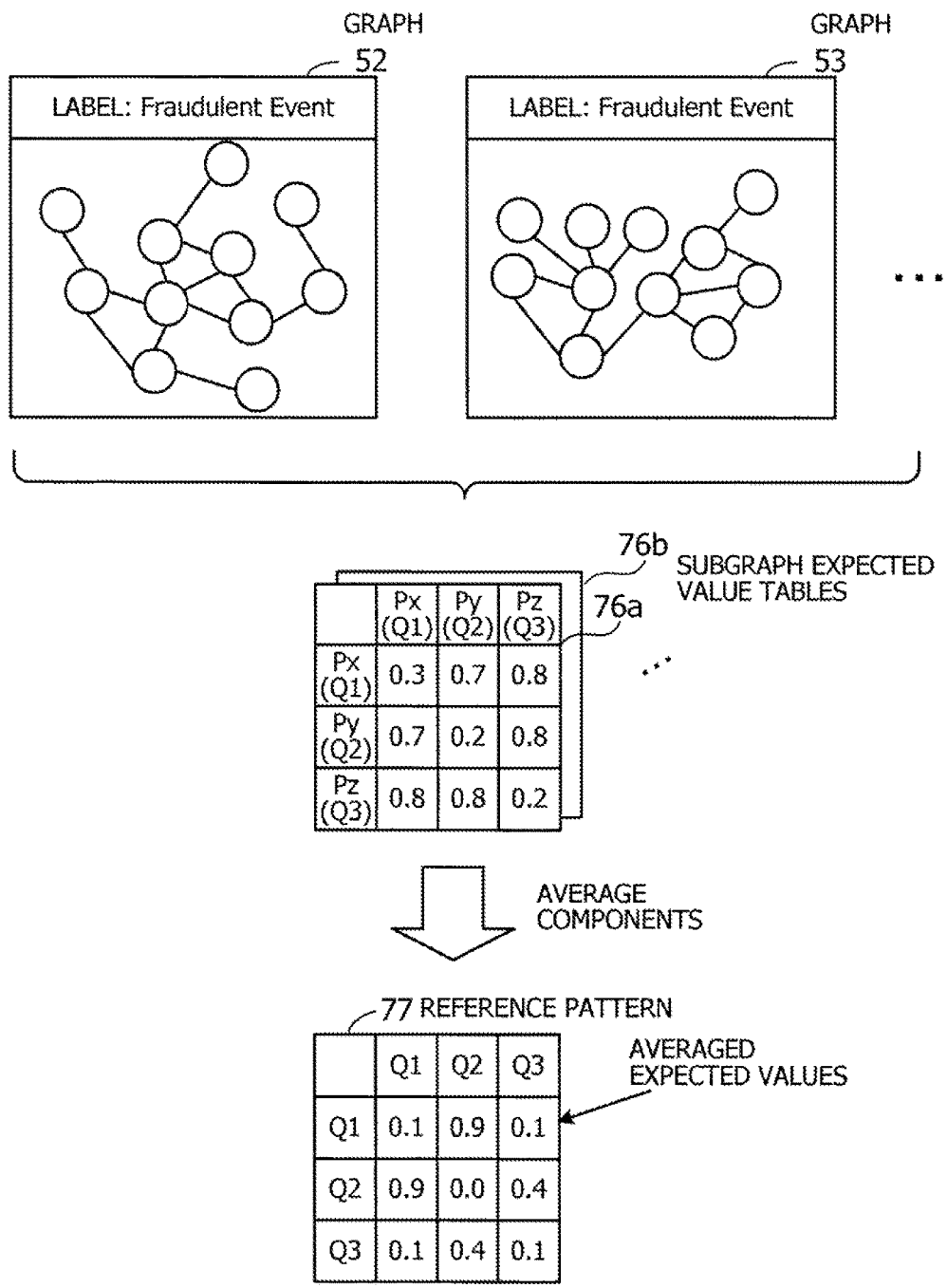
FIG. 22 illustrates an example of reference pattern generation.

FIG. 22 illustrates an example of generating a reference pattern. All the illustrated graphs 52, 53, . . . are labeled "fraudulent event," and a plurality of subgraph expected value tables 76a, 76b, . . . are generated from these graphs in the way discussed in FIG. 21. The expected values of node-to-node connections are then averaged between the subgraph expected value tables 76a, 76b, . . . and compiled into a reference pattern 77 by entering those averages to relevant cells.

Figure 23:
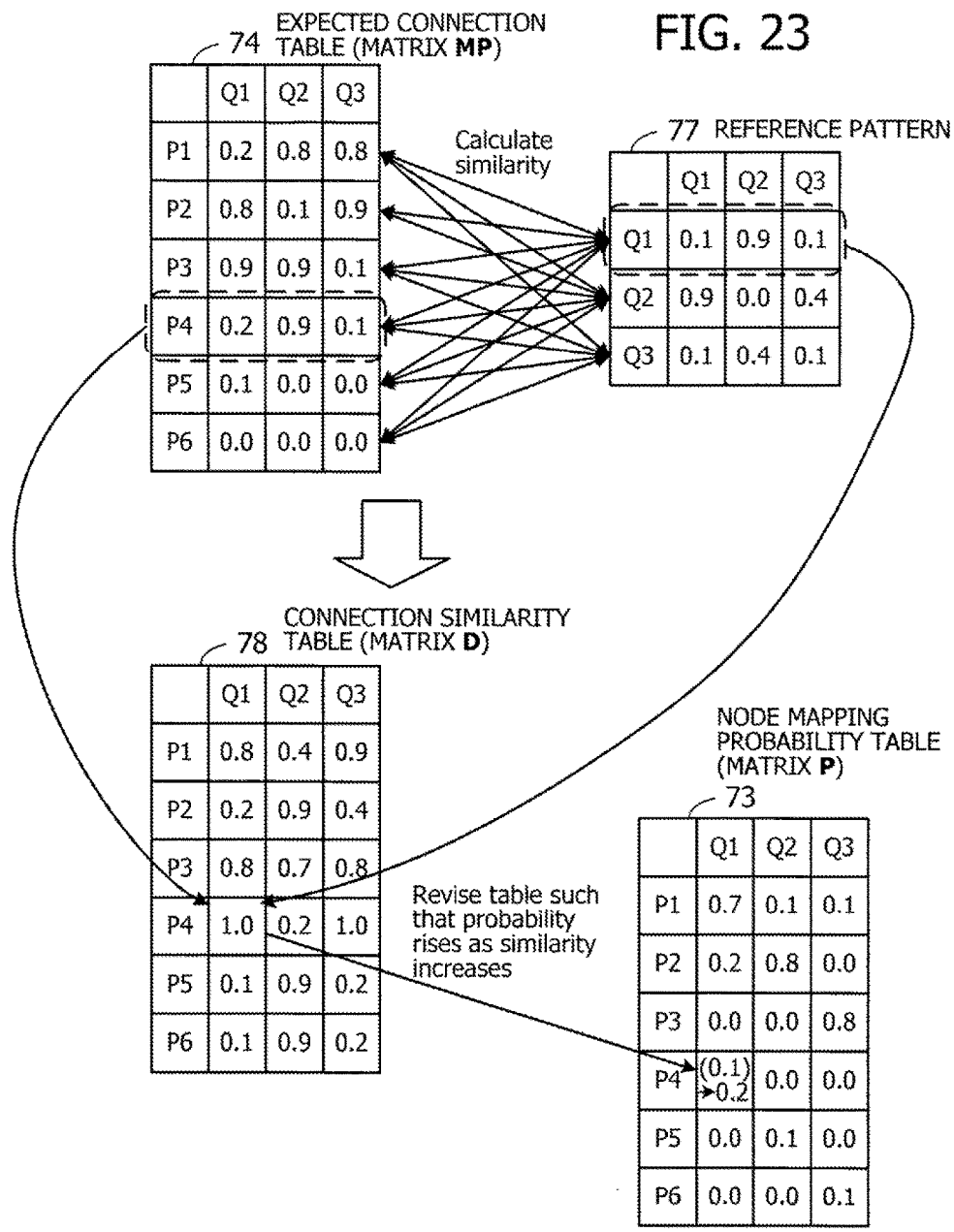
FIG. 23 illustrates an example of similarity calculation.

The reference pattern generation unit 140 now compares the expected connection table 74 with the generated reference pattern 77, thus calculating similarity between the source graph and reference pattern 77. FIG. 23 illustrates an example of similarity calculation. Specifically, this example assumes calculation of vector similarity between each row of the expected connection table 74 and each row of the reference pattern 77 in the way discussed in FIG. 15. The calculated similarity values are compiled into a connection similarity table 78.

The connection similarity table 78 has row headers containing the identifier of each node in the source graph 71 and column headers containing the identifier of each node in the reference pattern 77. Each intersection of a row and a column contains a value that indicates how the source-graph node corresponding to the row resembles the reference-pattern node corresponding to the column. This array of similarity values in the connection similarity table 78 is referred to as matrix D.

The reference pattern generation unit 140 revises probability values in the node mapping probability table 73 on the basis of similarity indicated by the connection similarity table 78 described above. For example, the reference pattern generation unit 140 gives higher probabilities to the node mapping probability table 73 for its elements with greater similarities.

Figure 24:
FIG. 24 illustrates an example of how node mapping probabilities are revised.

FIG. 24 illustrates an example of how node mapping probabilities are revised. For example, the reference pattern generation unit 140 adds similarity values of connections, each multiplied by a constant, to their corresponding probabilities in the node mapping probability table 73 and revises the resulting array of values in such a way that the values in each column amount to one. Specifically, this calculation procedure may be expressed in matrix form, which begins with the following equation:

$$P'=P+\lambda D \qquad (5)$$

where P is a node mapping probability table, and D is a connection similarity table 78. The symbol $\lambda$ represents a positive real number (e.g., $\lambda=0.1$ in FIG. 24). Then matrix P is updated according to the following equation:

$$P=P'S \qquad (6)$$

where S is a diagonal matrix whose diagonal components contain the reciprocals of total column values of P' as seen in FIG. 24. Equation (6) divides every component of matrix P' by the sum of values in its corresponding column, thereby normalizing the components so that the values in each column sum up to one.

The above update to the node mapping probability table 73 affects some values in the expected connection table 74 (FIG. 20) and subgraph expected value table 76 (FIG. 21). When the subgraph expected value table of one graph is updated, the reference pattern 77 is also updated accordingly as seen in FIG. 22. Now that both the expected connection table 74 and reference pattern 77 are updated, the connection similarity table 78 is then updated as seen in FIG. 23. This update of the connection similarity table 78 brings about an update to the node mapping probability table 73 as seen in FIG. 24. Such a chain of data updates is repeated until a specified termination condition is met. For example, the repetition may be terminated when the total amount of changes in the node mapping probability table 73 is decreased to or below a predetermined threshold. When the termination condition is met, the reference pattern generation unit 140 sends the latest version of the reference pattern 77 to the monitoring apparatus 100 as a final result. More specifically, the next section will now describe a reference pattern generation process.

Figure 25:
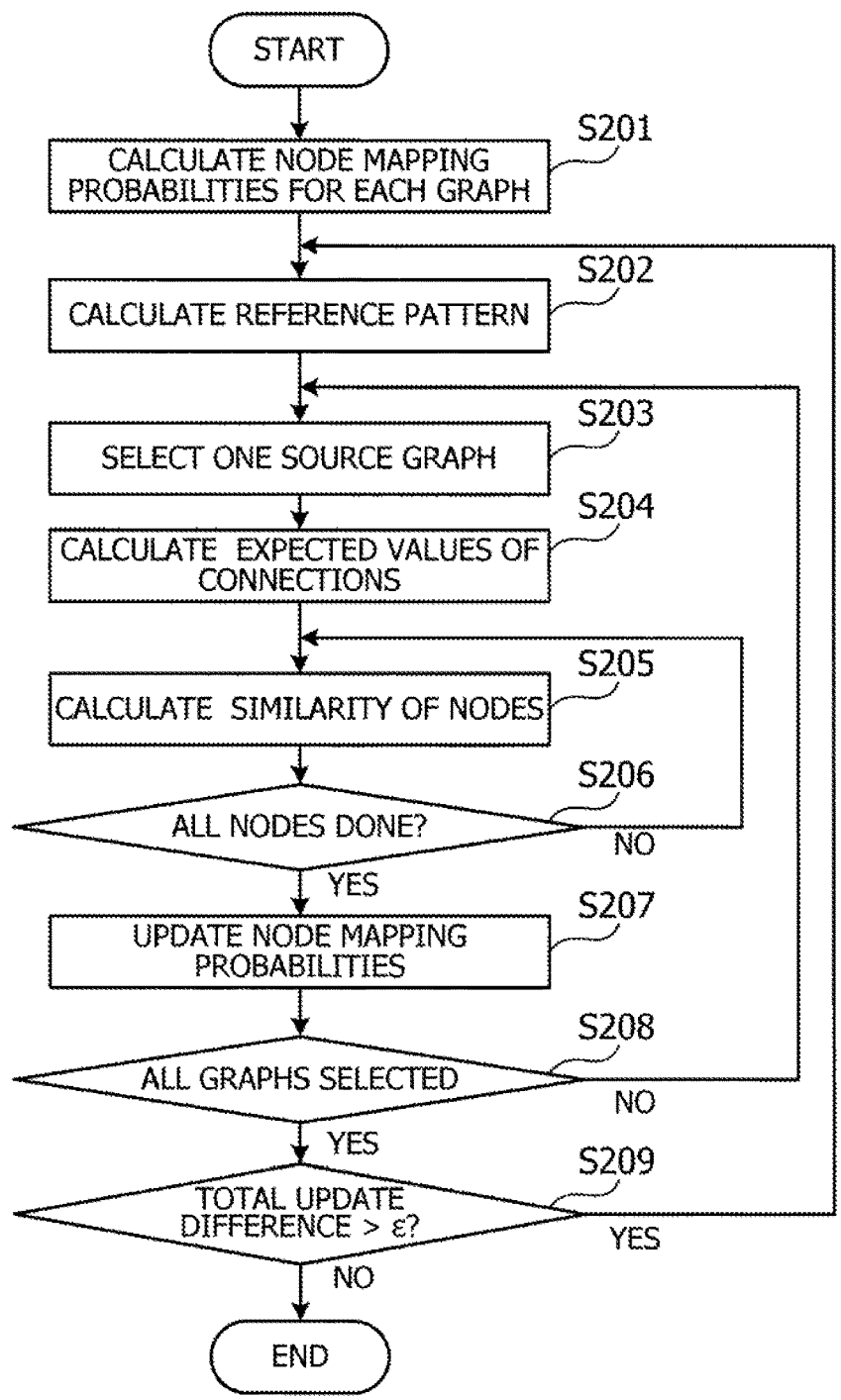
FIG. 25 is a flowchart illustrating an example of reference pattern generation according to a third embodiment.

FIG. 25 is a flowchart illustrating an example of a reference pattern generation process according to the third embodiment. Each operation in FIG. 25 is described below in the order of step numbers.

(Step S201) The reference pattern generation unit 140 generates node mapping probability tables for individual graphs by randomly selecting mapping probabilities of nodes in each source graph.

(Step S202) The reference pattern generation unit 140 calculates a reference pattern on the basis of the subgraph expected value table of each source graph.

(Step S203) The reference pattern generation unit 140 selects one of the source graphs.

(Step S204) Based on the graph dataset and node mapping probability table of the selected graph, the reference pattern generation unit 140 calculates expected values that represent how each node in the selected graph is expected to have a connection to nodes in the reference pattern. The calculated expected values are compiled into an expected connection table 74.

(Step S205) The reference pattern generation unit 140 extracts one node out of the selected graph and calculates similarity between the extracted node and each node of the reference pattern. The calculated similarity values are entered to the connection similarity table 78.

(Step S206) The reference pattern generation unit 140 determines whether it has extracted all nodes in the selected graph. When there is any pending node, the process returns to step S205. When all the nodes are extracted, the process advances to step S207.

(Step S207) The reference pattern generation unit 140 updates the mapping probability of each node that is indicated in the node mapping probability table 73 of the selected graph.

(Step S208) The reference pattern generation unit 140 determines whether it has selected all source graphs. When there is any pending graph, the process returns to step S203. When all the source graphs are selected, the process advances to step S209.

(Step S209) The reference pattern generation unit 140 sums up the changes that step S207 has made to the possibility values in the node mapping probability tables 73. The reference pattern generation unit 140 then compares the resulting sum of changes in the updates with 8 (i.e., a specified positive real number). If the sum is greater than $\epsilon$, the process returns to step S202. Otherwise, the reference pattern generation unit 140 terminates this reference pattern generation process after saving the latest reference pattern in the storage unit 110.

The above-described process discovers a frequent subgraph, thus generating a reference pattern. According to the third embodiment, the mapping relationships of nodes between a graph and a reference pattern are expressed in terms of probability. The use of probability-based representation means that all nodes in a source graph are subjected to the process of determining whether their connections are similar to the reference pattern, thus making it less likely to overlook a frequent graph in the source graph. The third embodiment also avoids combinatorial explosions and is thus capable of generating reference patterns in a practically reasonable time even if the source graph contains a large number of nodes.

(d) Other Applications

The above description of the first to third embodiments has proposed reference pattern generation processes. Those processes may be executed each time a new graph is generated, for example. This section will describe a technique for creating a new version of reference patterns in a short time by using existing reference patterns.

Figure 26:
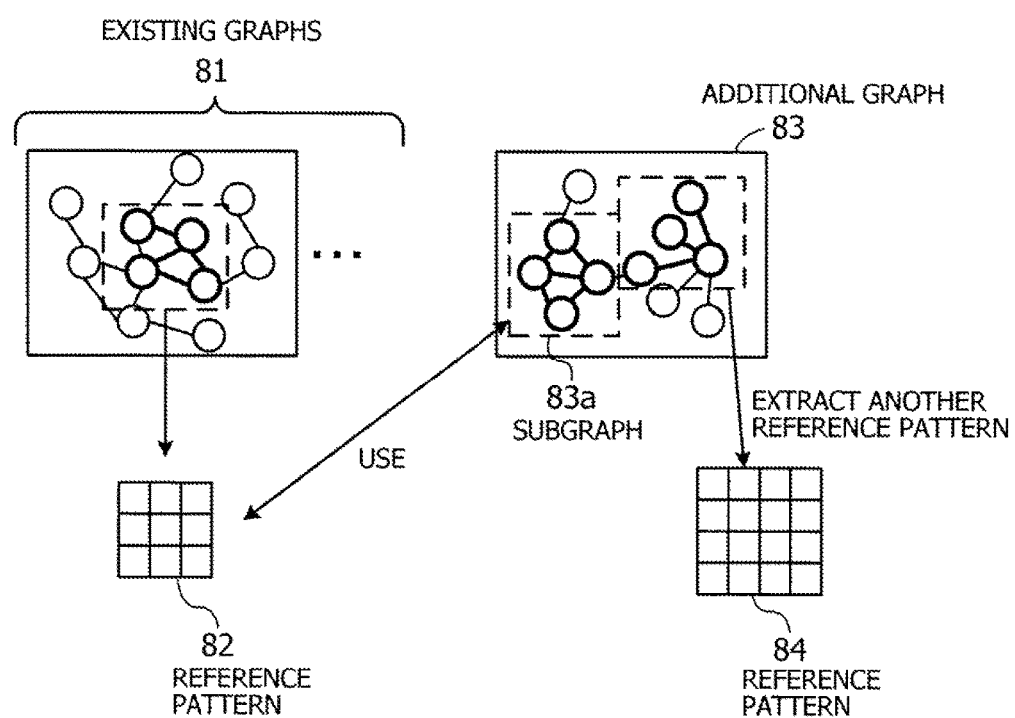
FIG. 26 illustrates an example of using an existing reference pattern.

FIG. 26 illustrates an example of using an existing reference pattern. There is a reference pattern 82 generated from existing graphs 81. Suppose now that a graph 83 is newly added. The reference pattern generation unit 140 may reuse the existing reference pattern 82 and its related data so as to accelerate extraction of a subgraph 83*a* that probably includes a frequent graph. The term "related data" refers to a set of data used when the reference pattern 82 was generated. Specifically, the related data includes a node mapping table, subgraph dataset, connection table, and similarity table discussed in the second embodiment. The related data in the third embodiment includes a node mapping probability table, expected connection table, subgraph expected value table, and connection similarity table.

The reuse of the reference pattern 82 and other things enables the monitoring apparatus 100 to extract a subgraph 83*a* in a short time. This feature allows the monitoring apparatus 100 to allocate its remaining processing resources to a process of searching for other reference patterns 84, thus making it possible to discover more reference patterns. In other words, the feature ensures extraction of a reference pattern that characterizes the graphs of days when fraudulent events happened.

The existing graphs 81 may actually be labeled "fraudulent event." In that case, if a subgraph 83*a* in the additional graph 83 resembles the reference pattern 82, then it indicates that some fraudulent event happened during the period in which the source logfile corresponding to the additional graph 83 was collected. That is, the reference pattern 82 makes it possible to quickly detect a fraud, scam, or other criminal activity that is similar to the past ones.

The monitoring apparatus 100 may be configured to search for another reference pattern 84 different from the existing reference pattern 82 each time a new graph 83 is added. This new reference pattern 84 may be useful in detecting another type of undesired events or even criminal activities. The monitoring apparatus 100 is thus able to promptly deal with new events that occur on a daily basis.

Various embodiments and their variations have been described above. In one aspect of those embodiments, the proposed technique makes it possible to extract frequent graphs in an efficient manner.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a graph processing program that causes a computer to execute a process comprising:

collecting logs from servers and forming the collected logs into a plurality of source graphs;

extracting a plurality of subgraphs from the plurality of source graphs, each of the plurality of subgraphs including a specific number of nodes;

first generating a plurality of connection matrixes for the plurality of subgraphs, respectively, each of the plurality of connection matrixes including connection information of a first plurality of nodes in a corresponding subgraph, each of the first plurality of nodes having an ordering number, the connection information including connection relationships among the first plurality of nodes and connection relationships between the first plurality of nodes and a plurality of neighboring nodes, the plurality of neighboring nodes being connected to at least one of the first plurality of nodes;

second generating a reference matrix from the plurality of connection matrixes, the reference matrix including connection pattern characteristic information of the plurality of subgraphs, the connection pattern characteristic information including connection pattern characteristics of nodes with a same ordering number in the plurality of subgraphs; and performing a node-ordering swap operation respectively for the each of the plurality of subgraphs, the node-ordering swap operation including swapping ordering numbers of two nodes in a subgraph to reorder nodes within the subgraph or swapping one node in the subgraph with a neighboring node that is outside the subgraph and connected to one of the nodes in the subgraph, such that a similarity between the reference matrix and a submatrix representing node-to-node connections in the subgraph becomes larger.

2. The non-transitory computer-readable storage medium according to claim 1, wherein the procedure further comprises:

executing, after the plurality of subgraphs are revised by the node-ordering swap operation, another round of the first generating, the second generating, and the performing of a node-ordering swap operation, with respect to the revised subgraphs.

3. The non-transitory computer-readable storage medium according to claim 2, wherein the procedure further comprises:

outputting a latest version of the reference matrix when the node-ordering swap operation is unable to obtain a node-ordering swap solution that makes the subgraph more similar to the reference matrix.

4. The non-transitory computer-readable storage medium according to claim 3, wherein the procedure further comprises:

receiving a new source graph after the latest version of the reference matrix is outputted;

extracting a new subgraph from the received new source graph; and performing a node-ordering swap operation on the extracted new subgraph, using the latest version of the reference matrix that has been outputted.

5. The non-transitory computer-readable storage medium according to claim 1, wherein the second generating evaluates average node-to-node connections in the plurality of subgraphs by calculating how many of nodes placed in a first node position in the subgraphs are connected to nodes placed in a second node position in the plurality of subgraphs.

6. A non-transitory computer-readable storage medium storing a graph processing program that causes a computer to to execute a process comprising:

collecting logs from servers and forming the collected logs into a plurality of source graphs;

generating stochastic matrixes respectively corresponding to the plurality of source graphs, each of the stochastic matrixes describing probabilities that individual nodes in a source graph are selected when generating a subgraph by sequentially selecting a specific number of nodes;

selecting the plurality of source graphs one by one as a first graph, and generating a first expected value matrix that includes first expected values, assuming that the specific number of nodes are sequentially selected from the selected first graph with the probabilities indicated in a stochastic matrix corresponding to the selected first graph, the first expected values representing expected presence of connections between each node in the selected first graph and the specific number of nodes that are sequentially selected from the selected first graph;

selecting the plurality of source graphs one by one as a second graph, and generating a second expected value matrix that includes second expected values, assuming that a subgraph is formed by sequentially selecting the specific number of nodes from the selected second graph with the probabilities indicated in a stochastic matrix corresponding to the selected second graph, the second expected values each representing expected presence of a connection between nodes that are selected from the selected second graph;

generating a reference matrix from the second expected value matrixes respectively corresponding to the plurality of source graphs, the reference matrix including connection pattern characteristic information of a plurality of subgraphs respectively extracted from the plurality of source graphs, the connection pattern characteristic information including connection pattern characteristics of nodes with a same ordering number in the plurality of subgraphs;

selecting the plurality of source graphs one by one as a third graph, calculating a similarity matrix that represents similarity between the reference matric and a second expected value matrix corresponding to the selected third graph, and revising the probabilities indicated in a stochastic matrix corresponding to the selected third graph, based on the calculated similarity matrix.

7. A graph processing method comprising:

collecting logs from servers and forming the collected logs into a plurality of source graphs;

extracting, by a processor, a plurality of subgraphs from the plurality of source graphs, each of the plurality of subgraphs including a specific number of nodes;

first generating, by the processor, a plurality of connection matrixes for the plurality of subgraphs, respectively, each of the plurality of connection matrixes including connection information of a first plurality of nodes in a corresponding subgraph, each of the first plurality of nodes having an ordering number, the connection information including connection relationships among the first plurality of nodes and connection relationships between the first plurality of nodes and a plurality of neighboring nodes, the plurality of neighboring nodes being connected to at least one of the first plurality of nodes;

second generating, by the processor, a reference matrix from the plurality of connection matrixes, the reference matrix including connection pattern characteristic information of the plurality of subgraphs, the connection pattern characteristic information including connection pattern characteristics of nodes with a same ordering number in the plurality of subgraphs; and performing, by the processor, a node-ordering swap operation respectively for the each of the plurality of subgraphs, the node-ordering swap operation including swapping ordering numbers of two nodes in a subgraph to reorder nodes within the subgraph or swapping one node in the subgraph with a neighboring node that is outside the subgraph and connected to one of the nodes in the subgraph, such that a similarity between the reference matrix and a representing node-to-node connections in the subgraph becomes larger.

8. An information processing apparatus comprising:

a memory configured to store a plurality of source graphs; and a processor coupled to the memory, the processor being configured to execute a process including:

collecting logs from servers and forming the collected logs into a plurality of source graphs;

extracting a plurality of subgraphs from the plurality of source graphs, each of the plurality of subgraphs including a specific number of nodes;

first generating a plurality of connection matrixes for the plurality of subgraphs, respectively, each of the plurality of connection matrixes including connection information of a first plurality of nodes in a corresponding subgraph, each of the first plurality of nodes having an ordering number, the connection information including connection relationships among the first plurality of nodes and connection relationships between the first plurality of nodes and a plurality of neighboring nodes, the plurality of neighboring nodes being connected to at least one of the first plurality of nodes;

second generating a reference matrix from the plurality of connection matrixes, the reference matrix including connection pattern characteristic information of the plurality of subgraphs, the connection pattern characteristic information including connection pattern characteristics of nodes with a same ordering number in the plurality of subgraphs; and performing a node-ordering swap operation respectively for the each of the plurality of subgraphs, the node-ordering swap operation including swapping ordering numbers of two nodes in a subgraph to reorder nodes within the subgraph or swapping one node in the subgraph with a neighboring node that is outside the subgraph and connected to one of the nodes in the subgraph, such that a similarity between the reference matrix and a submatrix representing node-to-node connections in the subgraph becomes larger.

9. The non-transitory computer-readable storage medium according to claim 1, wherein:

the logs are communication logs including records of communication performed between the servers; and the subgraphs include nodes that represent IP addresses of the servers.

10. The non-transitory computer-readable storage medium according to claim 1, wherein:

the logs are transaction logs including records of transactions performed between banks; and the subgraphs include nodes that represent individual bank accounts.

* * * * *